(12) United States Patent
Zhao et al.

(10) Patent No.: US 11,721,995 B2
(45) Date of Patent: Aug. 8, 2023

(54) BATTERY MANAGEMENT SYSTEM

(71) Applicant: SZ DJI TECHNOLOGY CO., LTD., Shenzhen (CN)

(72) Inventors: Tao Zhao, Shenzhen (CN); Juncheng Zhan, Shenzhen (CN); Yuancai Liu, Shenzhen (CN); Lei Wang, Shenzhen (CN); Wentao Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 362 days.

(21) Appl. No.: 17/035,178

(22) Filed: Sep. 28, 2020

(65) Prior Publication Data
US 2021/0028639 A1    Jan. 28, 2021

Related U.S. Application Data

(63) Continuation of application No. 15/387,395, filed on Dec. 21, 2016, now Pat. No. 10,797,499, which is a
(Continued)

(51) Int. Cl.
*H02J 7/00* (2006.01)
*H01M 10/48* (2006.01)
(Continued)

(52) U.S. Cl.
CPC .......... *H02J 7/0063* (2013.01); *B64C 39/024* (2013.01); *H01M 10/44* (2013.01);
(Continued)

(58) Field of Classification Search
CPC ............. H02J 2007/0067; H02J 7/0063; H02J 7/0029; H02H 7/18; H01M 10/48; H01M 10/44
(Continued)

(56) References Cited

U.S. PATENT DOCUMENTS 5,479,084 A * 12/1995 Satsuma ............... H02J 7/0069
320/136
5,834,131 A * 11/1998 Lutz ...................... G05D 23/00
429/7
(Continued)

FOREIGN PATENT DOCUMENTS

CN      101244697 A     8/2008
CN      101267124 A     9/2008
(Continued)

OTHER PUBLICATIONS

European search report and search opinion dated Apr. 18, 2017 for EP Application No. 14908164.8.
(Continued)

*Primary Examiner* — Richard V Muralidar
(74) *Attorney, Agent, or Firm* — Anova Law Group, PLLC

(57) ABSTRACT

A method of discharging a battery assembly used to power at least part of an object includes detecting when power to the object is turned off, detecting, with aid of a timer, an amount of time elapsed since the power to the object is turned off, and initiating a controlled self-discharge of the battery assembly when the amount of time exceeds a threshold length of time. The controlled self-discharge of the battery assembly is performed by a self-discharging circuit electrically coupled to the battery assembly.

19 Claims, 9 Drawing Sheets

Related U.S. Application Data continuation of application No. PCT/CN2014/094106, filed on Dec. 17, 2014.

(51) Int. Cl.
    *H01M 10/44*     (2006.01)
    *H02H 7/18*     (2006.01)
    *B64C 39/02*     (2023.01)
    *B64U 10/00*     (2023.01)

(52) U.S. Cl.
    CPC .............. *H01M 10/48* (2013.01); *H02H 7/18* (2013.01); *H02J 7/0029* (2013.01); *H02J 7/007182* (2020.01); *B64U 10/00* (2023.01); *H01M 2220/20* (2013.01); *H02J 7/0016* (2013.01); *H02J 7/0025* (2020.01); *H02J 7/00714* (2020.01)

(58) Field of Classification Search
    USPC .......................................... 320/127, 135, 136
    See application file for complete search history.

(56) References Cited

U.S. PATENT DOCUMENTS

| | | | | |
|---|---|---|---|---|
| 6,025,699 A | * | 2/2000 | Cummings | H02J 7/00309 320/112 |
| 6,531,846 B1 | * | 3/2003 | Smith | H02J 7/00309 320/135 |
| 7,656,125 B2 | * | 2/2010 | Lampe-Onnerud | H01M 10/425 320/133 |
| 2005/0029990 A1 | | 2/2005 | Tsukamoto et al. | |
| 2008/0190674 A1 | | 8/2008 | Nakanishi | |
| 2008/0224662 A1 | | 9/2008 | Hayakawa | |
| 2012/0280573 A1 | | 11/2012 | Ohkura et al. | |
| 2015/0266575 A1 | * | 9/2015 | Borko | B64F 1/222 244/17.23 |

FOREIGN PATENT DOCUMENTS

| | | |
|---|---|---|
| CN | 101552453 A | 10/2009 |
| CN | 102082310 A | 6/2011 |
| CN | 102823107 A | 12/2012 |
| CN | 203504205 U | 3/2014 |
| CN | 104199532 A | 12/2014 |
| JP | 2000134811 A | 5/2000 |
| WO | 2013062025 A1 | 5/2013 |

OTHER PUBLICATIONS

PCT Written Opinion of the International Search Authority dated Aug. 27, 2015 for International Application No. PCT/CN2014/094106.

* cited by examiner

BATTERY MANAGEMENT SYSTEM

CROSS-REFERENCE

This application is a continuation of application Ser. No. 15/387,395, filed on Dec. 21, 2016, which is a continuation of International Application No. PCT/CN2014/094106, filed on Dec. 17, 2014, the entire contents of both of which are incorporated herein by reference.

BACKGROUND

Battery assemblies may be used to provide power to stationary or movable objects such as ground vehicles, air vehicles, surface vehicles, underwater vehicles, and spacecraft. The battery assembly for movable objects, such as an unmanned aerial vehicle (UAV) for example, may have higher power, larger discharge rate, shorter service time and stricter security standard compared to conventional batteries.

However, the battery assembly may be damaged if it is not maintained properly. In some instances, the battery assembly may have a shorter battery life or even swell or leak if it is charged but left unused for a long term.

SUMMARY

The present disclosure provides systems, methods, and devices for managing a battery assembly used to power an object such, as an unmanned aerial vehicle (UAV). In some instances, a battery assembly may be charged but then left unused for a long term. In this case, since a chemical activity of the charged battery assembly is high, the battery assembly may swell or leak and thus become hazardous to users and the environment. Accordingly, in order to properly maintain the battery assembly and extend the battery life, a need exists for battery management systems that control the storage voltage of the battery assembly. In some embodiments, the present disclosure provides systems, methods, and devices of controllably discharging a battery assembly for a long-term storage. The battery assembly of an object may be managed by a battery management system which detects when the power to the object is turned off, and detects an amount of time elapsed since the power to the object is turned off. When the amount of time exceeds a threshold length of time, the battery management system may initiate a controlled self-discharge of the battery assembly until a voltage of the battery assembly reaches a value which is safe for long-term storage. The controlled self-discharge of the battery assembly may be terminated when the power to the object is turned on during the self-discharge.

The present disclosure also provides systems, methods, and devices of discharging a battery assembly for a long-term storage in which a controlled self-discharge of the battery assembly may be initiated when the battery assembly is not in use for a threshold length of time. The controlled self-discharge of the battery assembly may be terminated if the battery is in use again or the battery assembly reaches a threshold voltage value during the self-discharge.

The controlled self-discharge of the battery assembly of the present disclosure may be implemented by electrically coupling a self-discharging circuit to the battery assembly and electrically coupling a battery management system to the self-discharging circuit. The self-discharging circuit may comprise a self-discharging resistor and a control switch connected in parallel with positive and negative terminals of the battery assembly. By controlling a storage voltage of the battery assembly, the battery assembly may be stored at a safe storage voltage, thus damage to the battery may be avoid during the long-term storage and a battery life may be extended.

An aspect of the disclosure may include a method of discharging a battery assembly used to power at least part of an object, the method comprising: detecting when power to the object is turned off; detecting, with aid of a timer, an amount of time elapsed since the power to the object is turned off; and initiating a controlled self-discharge of the battery assembly when the amount of time exceeds a threshold length of time.

In some embodiments, the method may further comprise detecting a voltage of the battery assembly during the controlled self-discharge of the battery assembly, and terminating the controlled self-discharge of the battery assembly when the voltage reaches a threshold voltage value. In some instances, the threshold voltage value may be about 50% a nominal voltage of the battery assembly. For example, the threshold voltage value is about 38V. The threshold voltage may be configured to enable safe long-term storage of the battery assembly. In some embodiments, the method may further comprise entering a hibernation mode subsequent to terminating the controlled self-discharge of the battery assembly.

In some embodiments, the method may further comprise detecting when the power to the object is turned on, and terminating the controlled self-discharge of the battery assembly when the power to the object is turned on. Alternatively, the method may further comprise detecting if the battery assembly powers the at least the part of the object, and terminating the controlled self-discharge of the battery assembly if the battery assembly powers the at least the part of the object.

In some embodiments, the controlled self-discharge of the battery assembly may be performed by a self-discharging circuit electrically coupled to the battery assembly. In some instances, the self-discharging circuit comprises a self-discharging resistor and a control switch connected in parallel with positive and negative terminals of the battery assembly. The controlled self-discharge may be initiated when the control switch is switched to a closed state, and may be terminated when the control switch is switched to an open state.

In some embodiments, the battery assembly may comprise a plurality of battery cells. Alternatively, the battery assembly may comprise only a single battery cell. In some embodiments, the object may be a movable object, such as an unmanned aerial vehicle (UAV). In some instances, the battery assembly may be onboard the UAV. In some embodiments, the battery assembly may be used to power a propulsion system of the UAV. The battery assembly may be within a housing of the object.

In some embodiments, the threshold length of time may be at least one to ten days. In some instances, the threshold length of time may be predetermined. Alternatively, the threshold length of time may be set based on user input.

Aspects of the disclosure may further include an apparatus for discharging a battery assembly used to power at least part of an object, the apparatus comprising: a timer configured to: (1) receive a signal when the power to the object is turned off and initiate timing in response thereto and (2) detect an amount of time elapsed since the power to the object is turned off; and one or more processors individually or collectively configured to: (1) receive a signal from the timer indicative of the amount of time elapsed and (2)

generate a signal that initiates a controlled self-discharge of the battery assembly when the amount of time elapsed exceeds a threshold length of time.

In some embodiments, the one or more processors individually or collectively may be further configured to receive a signal indicative of a voltage of the battery assembly during the controlled self-discharge of the battery assembly, and to generate a signal that terminates the controlled self-discharge of the battery assembly when the voltage reaches a threshold voltage value. In some instances, the threshold voltage value may be about 50% a nominal voltage of the battery assembly. For example, the threshold voltage value may be about 38V. The threshold voltage is configured to enable safe long-term storage of the battery assembly. In some embodiments, the one or more processors individually or collectively may be further configured to generate a signal that enters the battery assembly into a hibernation mode subsequent to terminating the controlled self-discharge of the battery assembly.

In some embodiments, the one or more processors individually or collectively may be further configured to receive a signal indicative of when the power to the object is turned on, and to generate a signal that terminates the controlled self-discharge of the battery assembly when the power to the object is turned on. Alternatively, the one or more processors individually or collectively may be further configured to receive a signal indicative of the battery assembly powers the at least the part of the object, and to generate a signal that terminates the controlled self-discharge of the battery assembly if the battery assembly powers the at least the part of the object.

In some embodiments, the apparatus may further comprise a self-discharging circuit electrically coupled to the battery assembly. In some instances, the self-discharging circuit may comprise a self-discharging resistor and a control switch connected in parallel with positive and negative terminals of the battery assembly. The controlled self-discharge may be initiated when the control switch is switched to a closed state, and may be terminated when the control switch is switched to an open state.

In some embodiments, the battery assembly may comprise a plurality of battery cells. Alternatively, the battery assembly may comprise only a single battery cell. In some instances, the object may be a movable object, such as an unmanned aerial vehicle (UAV). In some embodiments, the battery assembly may be onboard the UAV. The battery assembly may be used to power a propulsion system of the UAV. In some instances, the battery assembly may be within a housing of the object.

In some embodiments, the threshold length of time may be at least one to ten days. In some instances, the threshold length of time may be predetermined. Alternatively, the threshold length of time may be set based on user input.

Aspects of the disclosure may further include an unmanned aerial vehicle, comprising a battery assembly and the apparatus as described herein above operably coupled to the battery assembly.

A method of discharging a battery assembly may be provided in accordance with another aspect of the disclosure. The method may comprise: detecting, with aid of a timer, when the battery assembly is not in use for a threshold length of time; initiating a controlled self-discharge of the battery assembly when the battery assembly is not in use for the threshold length of time; and terminating the controlled self-discharge of the battery assembly when (1) the battery assembly is in use, or (2) the battery assembly voltage reaches a threshold voltage value.

In some embodiments, the threshold voltage value may be about 50% a nominal voltage of the battery assembly. For example, the threshold voltage value may be about 38V. The threshold voltage may be configured to enable safe long-term storage of the battery assembly.

In some embodiments, the method may further comprise entering a hibernation mode subsequent to terminating the controlled self-discharge of the battery assembly when the battery assembly voltage reaches the threshold voltage value.

In some embodiments, the controlled self-discharge of the battery assembly may be performed by a self-discharging circuit electrically coupled to the battery assembly. In some instances, the self-discharging circuit may comprise a self-discharging resistor and a control switch connected in parallel with positive and negative terminals of the battery assembly. The controlled self-discharge may be initiated when the control switch is switched to a closed state, and may be terminated when the control switch is switched to an open state.

In some embodiments, the battery assembly may comprise a plurality of battery cells. Alternative, the battery assembly may comprise only a single battery cell. In some embodiments, the object may be a movable object, such as an unmanned aerial vehicle (UAV). In some instances, the battery assembly may be onboard the UAV. The battery assembly may be used to power a propulsion system of the UAV. In some instances, the battery assembly may be within a housing of the object.

In some embodiments, the threshold length of time may be at least one to ten days. In some instance, the threshold length of time may be predetermined. Alternatively, the threshold length of time may be set based on user input.

An apparatus for discharging a battery assembly used to power at least part of an object may be provided in accordance with another aspect of the disclosure. The apparatus may comprise: a timer configured to detect an amount of time that the battery assembly is not in use; and one or more processors individually or collectively configured to: receive a signal from the timer indicative of the amount of time, generate a signal that initiates a controlled self-discharge of the battery assembly when the amount of time exceeds a threshold length of time, and generate a signal that terminates the controlled self-discharge of the battery assembly when (1) the battery assembly is in use, or (2) the battery assembly voltage reaches a threshold voltage value.

In some embodiments, the threshold voltage value is about 50% a nominal voltage of the battery assembly. For example, the threshold voltage value may be about 38V. The threshold voltage may be configured to enable safe long-term storage of the battery assembly.

In some embodiments, the one or more processors individually or collectively may be further configured to generate a signal that enters the battery assembly into a hibernation mode subsequent to terminating the controlled self-discharge of the battery assembly when the battery assembly voltage reaches the threshold voltage value.

In some embodiments, the apparatus may further comprise a self-discharging circuit electrically coupled to the battery assembly. In some instances, the self-discharging circuit may comprise a self-discharging resistor and a control switch connected in parallel with positive and negative terminals of the battery assembly. The controlled self-discharge may be initiated when the control switch is switched to a closed state, and may be terminated when the control switch is switched to an open state.

In some embodiments, the battery assembly may comprise a plurality of battery cells. Alternatively, the battery assembly may comprise only a single battery cell. In some embodiments, the object may be a movable object, such as an unmanned aerial vehicle (UAV). In some instances, the battery assembly may be onboard the UAV. For example, the battery assembly is used to power a propulsion system of the UAV. In some instance, the battery assembly may be within a housing of the object.

In some embodiments, the threshold length of time may be at least one to ten days. In some instances, the threshold length of time may be predetermined. Alternatively, the threshold length of time may be set based on user input.

Aspects of the disclosure may further include an unmanned aerial vehicle, comprising a battery assembly and the apparatus as described herein above.

An apparatus for managing discharge of a battery assembly may be provided in accordance with another aspect of the disclosure. The apparatus may comprise: the battery assembly comprising one or more battery cells; a self-discharging circuit electrically coupled to the battery assembly; and a battery management system configured to control operation of the self-discharging circuit in order to permit controlled self-discharge of the battery assembly, wherein the battery management system is configured to cause the battery assembly to discharge via the self-discharging circuit when a timer exceeds a threshold length of time.

In some embodiments, the battery assembly may comprise a positive terminal and a negative terminal, and wherein the self-discharging circuit may comprise a self-discharging resistor and a control switch connected in parallel with the positive and negative terminals. In some instances, the battery management system may control operation of the control switch. The controlled self-discharge may occur when the control switch is switched to a closed state, and wherein the controlled self-discharge may not occur when the control switch is switched to an open state.

In some embodiments, the battery management system may cause the battery assembly to terminate discharging via the self-discharging circuit when a voltage of the battery assembly reaches a threshold voltage value. In some instances, the threshold voltage value may be about 50% a nominal voltage of the battery assembly. For example, the threshold voltage value may be about 38V. The threshold voltage may be configured to enable safe long-term storage of the battery assembly.

In some embodiments, the battery management system may cause the battery assembly to terminate discharging via the self-discharging circuit when an average voltage of the one or more battery cells reaches a threshold voltage value. In some instances, the threshold voltage value may be about 50% a nominal voltage of the battery cell. For example, the threshold voltage value may be about 3.8V. The threshold voltage may be configured to enable safe long-term storage of the battery assembly.

In some embodiments, the battery assembly may be used to power at least a part of an object. In some instances, the object may be a movable object, such as an unmanned aerial vehicle (UAV). In some instances, the battery assembly may be onboard the UAV. The battery assembly may be used to power a propulsion system of the UAV.

In some embodiments, the battery management system may be configured to start the timer when the battery management system detects that power to the object is turned off.

In some embodiments, the battery management system may be configured to cause the battery assembly to terminate discharging via the self-discharging circuit when the battery assembly is powering the at least the part of the object. In some instances, the battery management system may comprise the timer.

In some embodiments, the battery assembly, self-discharging circuit, and battery management system may be provided within a housing. In some embodiments, the threshold length of time may be at least one to ten days. In some instances, the threshold length of time may be predetermined. Alternatively, the threshold length of time may be set based on user input.

A method for managing discharge of a battery assembly may be provided in accordance with another aspect of the disclosure. The method may comprise: providing the apparatus as described herein above; and receiving, at the battery management system, a signal that causes the timer to start timing.

In some embodiments, the signal may indicate that the battery assembly is not in use. In some embodiments, the battery assembly may power at least a part of an object, and wherein the signal may indicate that power to the object is turned off. Alternatively, the battery assembly may power at least a part of an object, and wherein the signal may indicate that the battery assembly is not electrically coupled to the object.

Aspects of the disclosure may further include an unmanned aerial vehicle comprising the apparatus as described herein above.

A method for assembling an apparatus for managing discharge of a battery assembly may be provided in accordance with another aspect of the disclosure. The method may comprise: providing the battery assembly comprising one or more battery cells; electrically coupling a self-discharging circuit to the battery assembly; and electrically coupling a battery management system to the self-discharging circuit, wherein the battery management system is configured to control operation of the self-discharging circuit in order to permit controlled self-discharge of the battery assembly, and wherein the battery management system is configured to cause the battery assembly to discharge via the self-discharging circuit when a timer exceeds a threshold length of time.

In some embodiments, the battery assembly may comprise a positive terminal and a negative terminal, and wherein the self-discharging circuit may comprise a self-discharging resistor and a control switch connected in parallel with the positive and negative terminals. In some instances, the battery management system may control operation of the control switch. For example, the controlled self-discharge may occur when the control switch is switched to a closed state, and wherein the controlled self-discharge may not occur when the control switch is switched to an open state. In some embodiments, the battery management system may cause the battery assembly to terminate discharging via the self-discharging circuit when a voltage of the battery assembly reaches a threshold voltage value.

In some embodiments, the threshold voltage value may be about 50% a nominal voltage of the battery assembly. For example, the threshold voltage value may be about 38V. Alternatively, the battery management system may cause the battery assembly to terminate discharging via the self-discharging circuit when an average voltage of the one or more battery cells reaches a threshold voltage value. In some instances, the threshold voltage value may be about 50% a nominal voltage of the battery cell. For example, the threshold voltage value may be about 3.8V. The threshold voltage is configured to enable safe long-term storage of the battery assembly.

In some embodiments, the battery assembly may be used to power at least a part of an object. In some instances, the object may be a movable object, such as an unmanned aerial vehicle (UAV). The battery assembly may be onboard the UAV. In some instances, the battery assembly may be used to power a propulsion system of the UAV.

In some embodiments, the battery management system may be configured to start the timer when the battery management system detects that power to the object is turned off. In some instances, the battery management system may be configured to cause the battery assembly to terminate discharging via the self-discharging circuit when the battery assembly is powering the at least the part of the object.

In some embodiments, the battery management system may comprise the timer. In some instances, the battery assembly, self-discharging circuit, and battery management system may be provided within a housing. In some instances, the threshold length of time may be at least one to ten days. The threshold length of time may be predetermined. Alternatively, the threshold length of time may be set based on user input.

A method for discharging a plurality of battery assemblies used to power at least part of an object may be provided in accordance with another aspect of the disclosure. The method may comprise: identifying, from the plurality of battery assemblies, one or more battery assemblies meeting certain criteria for self-discharge; and initiating a controlled self-discharge of the one or more battery assemblies meeting certain criteria for self-discharge.

In some embodiments, the certain criteria for self-discharge may be an amount of time elapsed since power to the object is turned off exceeding a threshold length of time. In some instances, the method may further comprise detecting when the power to the object is turned off; and detecting, with aid of a timer, an amount of time elapsed since the power to the object is turned off. In some instances, the method may further comprise detecting a voltage of the one or more battery assemblies during the controlled self-discharge of the one or more battery assemblies. In some instance, the method may further comprise terminating the controlled self-discharge of the corresponding one or more battery assemblies when the voltage reaches a threshold voltage value.

In some embodiments, the method may further comprise detecting when the power to the object is turned on. In some instances, the method may further comprise terminating the controlled self-discharge of the battery assembly when the power to the object is turned on. In some instances, the method may further comprise detecting if the one or more battery assemblies power the at least the part of the object. In some instances, the method may further comprise terminating the controlled self-discharge of the one or more battery assemblies if the battery assembly power the at least the part of the object.

In alternative embodiments, the certain criteria for self-discharge may be the one or more battery assemblies being not in use for a threshold length of time. In some instances, the method may further comprise detecting, with aid of a timer, when the one or more battery assemblies are not in use for a threshold length of time. In some instances, the method may further comprise terminating the controlled self-discharge of the one or more battery assemblies when (1) the one or more battery assemblies are in use, or (2) a voltage of the one or more battery assemblies reaches a threshold voltage value.

In some instances, the controlled self-discharge of the one or more battery assemblies may be performed by a self-discharging circuit electrically respectively coupled to the one or more battery assemblies. In some instances, the self-discharging circuit may comprise a self-discharging resistor and a control switch connected in parallel with positive and negative terminals of the battery assembly. In some instances, the controlled self-discharge may be initiated when the control switch is switched to a closed state and is terminated when the control switch is switched to an open state.

In some embodiments, the object may be a movable object. The movable object may be an unmanned aerial vehicle (UAV), and the plurality of battery assemblies may be onboard the UAV. In some instances, the plurality of battery assemblies may be used to power different components of the UAV.

An apparatus for managing discharge of a plurality of battery assemblies may be provided in accordance with another aspect of the disclosure. The apparatus may comprise: the plurality of battery assemblies each comprising one or more battery cells; a self-discharging circuit electrically coupled to each battery assembly of the plurality; and a battery management system configured to control operation of the respective self-discharging circuit in order to permit controlled self-discharge of each battery assembly of the plurality, wherein the battery management system is configured to cause one or more battery assemblies to discharge via the respective self-discharging circuit when the one or more battery assemblies meet certain criteria for self-discharge.

In some embodiments, the certain criteria for self-discharge may be an amount of time elapsed since power to the object is turned off exceeding a threshold length of time. Alternatively, the certain criteria for self-discharge may be the one or more battery assemblies being not in use for a threshold length of time.

In some embodiments, respective self-discharging circuit may each comprise a self-discharging resistor and a control switch connected in parallel with the positive and negative terminals. In some instances, the battery management system may control operation of the control switch. In some instances, the controlled self-discharge may occur when the control switch is switched to a closed state and wherein the controlled self-discharge, and may not occur when the control switch is switched to an open state.

In some embodiments, the battery management system may be configured to cause the one or more batteries assembly to terminate discharging via the respective self-discharging circuit when a voltage of the one or more battery assembles reaches a threshold voltage value. In some instances, the plurality of battery assemblies may be used to power at least a part of an object. For example, the object may be a movable object, such as an unmanned aerial vehicle (UAV). In some instances, the plurality battery assemblies may be onboard the UAV. The plurality of battery assemblies may be used to power different components of the UAV.

In some embodiments, the battery management system may be configured to cause the one or more battery assemblies to terminate discharging via the respective self-discharging circuit when the one or more battery assembly are powering the at least the part of the object. In some instances, the battery management system may be configured to cause the battery assembly to terminate discharging via the self-discharging circuit when the battery assembly is in use.

Aspects of the disclosure may further include an unmanned aerial vehicle comprising the apparatus as described herein above.

It shall be understood that different aspects of the disclosure can be appreciated individually, collectively, or in combination with each other. Various aspects of the disclosure described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Figure 1:
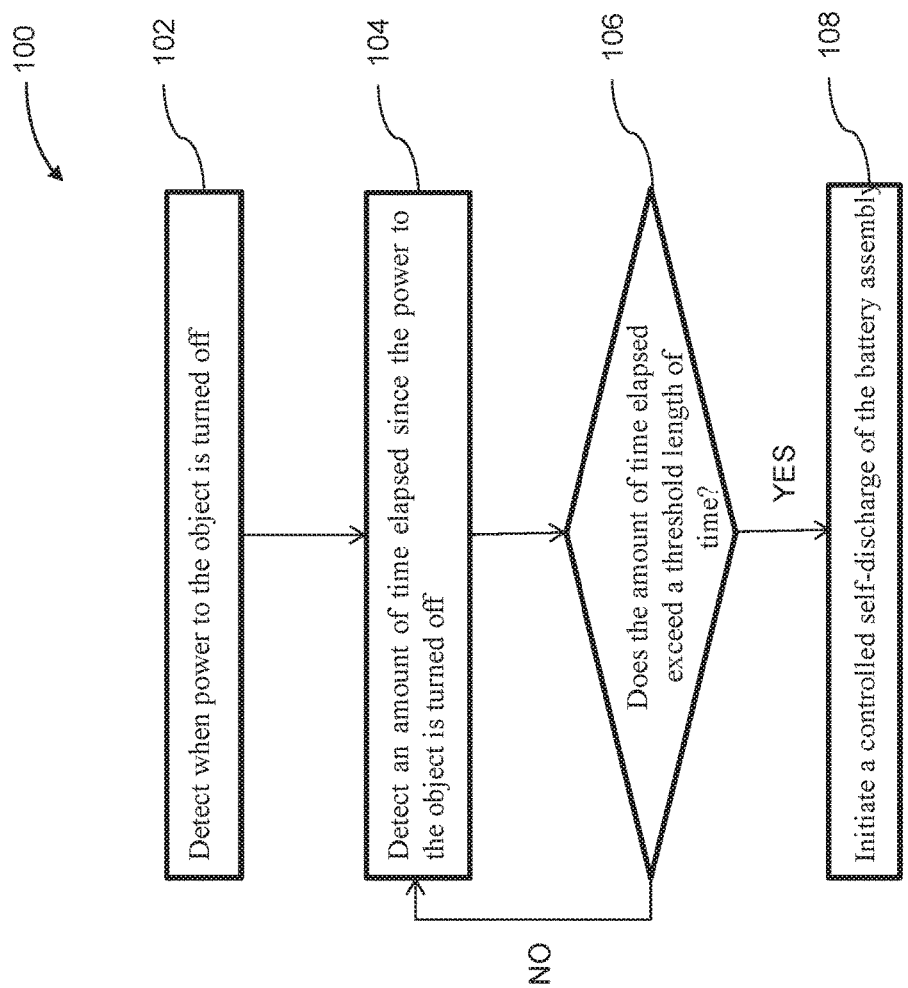
FIG. 1 is a flow chart illustrating a method of discharging a battery assembly, in accordance with an embodiment of the disclosure.

The systems, methods, and devices described herein provide an effective approach for reducing or preventing damage to a battery assembly during long-term storage. When a battery assembly is charged but then left unused for a long term, the battery life may be shortened due to damage to the battery, e.g., the battery may swell or leak because chemical activity of the charged battery assembly is high. In order to prevent such situations from occurring, the battery assembly may be managed by a battery management system which may monitor and control a storage voltage of the battery assembly. In some embodiments, the battery assembly is used to power an object, e.g., a movable object such as an unmanned aerial vehicle (UAV). The battery management system may detect when the power to the object is turned off, and detect an amount of time elapsed since the power to the object is turned off. When the amount of time exceeds a threshold length of time, the battery management system may initiate a controlled self-discharge of the battery assembly until the voltage of the battery assembly reaches a value which is safe for long-term storage. In some embodiments, the controlled self-discharge of the battery assembly may be terminated if the power to the object is turned on during the self-discharge.

In some embodiments, the systems, methods, and devices of the present disclosure may initiate a controlled self-discharge of the battery assembly when the battery assembly is not in use for a threshold length of time. The controlled self-discharge of the battery assembly may be terminated if the battery is in use again or the battery assembly reaches a threshold voltage value during the self-discharge.

In the systems, methods, and devices described herein, the self-discharge of the battery assembly may be implemented by a self-discharging circuit which is electrically coupled to the battery assembly. The self-discharging circuit may comprise a self-discharging resistor and a control switch connected in parallel with positive and negative terminals of the battery assembly. The controlled self-discharge may be initiated when the control switch is switched to a closed state (e.g., the switch is "on") and may be terminated when the control switch is switched to an open state (e.g., the switch is "off").

Advantageously, the systems, methods, and devices provided herein enable automatic controlled self-discharge of a battery assembly during long-term storage, thereby improving the lifespan, safety, and ease of use of such battery assemblies.

The battery assemblies of the present disclosure can be adapted to provide power to at an object, which may be a movable object or a stationary object. A movable object may be capable of self-propelled movement (e.g., a vehicle), while a stationary object may not be capable of self-propelled movement. The battery assembly can power at least a part of an object, such as one or more electrical components of the object. Examples of electrical components that can be powered by a battery assembly include but are not limited to propulsion systems (e.g., rotors, wheels), sensors (e.g., GPS sensors, inertial sensors, cameras, ultrasonic sensors, infrared sensors, lidar, radar), control systems, communication systems (e.g., receivers, transmitters, transceivers, user interfaces), payloads, and so on.

In some embodiments, the movable object may be an unmanned aerial vehicle (UAV). The UAV may have one or more propulsion units that may permit the UAV to move about in the air. The UAV may be a rotorcraft. In some instances, the UAV may be a multi-rotor craft that may include a plurality of rotors. The plurality of rotors may be capable of rotating to generate lift for the UAV, enabling the UAV to move about freely through the air (e.g., with up to three degrees of freedom in translation and/or up to three degrees of freedom in rotation). In some embodiments, the battery assembly may be onboard the UAV. The battery assembly may be used to power a propulsion system of the UAV, for example, a rotor of the UAV. Alternatively, the battery assembly may be used to power other electrical components on board the UAV, including but not limited to, control systems (e.g., flight controller), sensors, communication system, payload (e.g., camera, gimbal), etc. Additional examples of movable objects suitable for use with the embodiments of the present disclosure are provided in further detail below.

An object can be powered by any suitable number and combination of battery assemblies. In some embodiments, the object includes only a single battery assembly. In other embodiments, the object includes a plurality of battery assemblies, such as two, three, four, five, or more battery assemblies. The battery assemblies can be arranged on the object as desired. For example, a battery assembly can be situated within the interior of object (e.g., within an internal cavity of the object and/or attached to an internal surface of the object) or on the exterior of the object (e.g., on an external surface of the object, such as on a top, bottom, front, back, or side surface). In some embodiments, the battery assembly may be provided within a housing of the object. Alternatively, the battery assembly may be provided outside a housing of the object.

The battery assemblies of the present disclosure can be electrically coupled to at least a part of the object, e.g., via electrical connectors such as wires, cables, pins, contacts, and the like. In some embodiments, the battery assembly is removably coupled to the object, such that the battery can be removed from the object, e.g., for charging, replacement, etc. In alternative embodiments, the battery assembly is permanently affixed to the object and cannot be removed from the object.

In some embodiments, the battery assembly may comprise a plurality of battery cells. The plurality of battery cells may be electrically connected in series or in parallel. Alternatively, the battery assembly may comprise only a single battery cell. The battery cell(s) of a battery assembly can be contained within a housing of the battery assembly, such that the battery assembly is provided as a single unitary device, thereby facilitating handling of the battery assembly.

The battery assembly may be any type of suitable battery assembly which is adapted to be mounted on or within the object in order to supply power to one or more electrical components of the object. In some embodiments, the battery assembly is a non-rechargeable battery or primary battery. In other embodiments, the battery assembly may be a rechargeable battery or secondary battery. Examples of battery assembly types suitable for use with the embodiments described herein include but are not limited to: lead-acid batteries, alkaline batteries, nickel-iron batteries, nickel-cadmium batteries, nickel-hydrogen batteries, nickel-metal hydride batteries, nickel-zinc batteries, lithium-air (organic) batteries, lithium cobalt oxide batteries, lithium-ion polymer batteries, lithium iron phosphate batteries, lithium sulfur batteries, lithium-titanate batteries, sodium-ion batteries, thin film lithium batteries, zinc-bromide batteries, zinc-cerium batteries, vanadium redox batteries, sodium-sulfur batteries, molten salt batteries, silver-oxide batteries, or quantum batteries (oxide semiconductor). In some embodiments, the battery assembly may be lithium cobalt oxide batteries.

The battery assembly may provide a voltage to one or more electrical components onboard the object, also referred to herein as an "output voltage." In some instances, the battery assembly may provide an output voltage greater than or equal to about 0.01 V, 0.05 V, 0.1 V, 0.5 V, 1.0 V, 1.5 V, 2.0 V, 2.5 V, 3.0 V, 3.5 V, 4.0 V, 4.5 V, 5.0 V, 5.5 V, 6.0 V, 6.5 V, 7.0 V, 7.5 V, 8.0 V, 8.5 V, 9.0 V, 9.5 V, 10 V, 15 V, 20 V, 25 V, 30 V, 35 V, 40 V, 45 V, 50 V, 55 V, 60 V, 65 V, 70 V, 75 V, 80 V, 85 V, 90 V, 95 V, or 100 V. Optionally, the output voltage of the battery assembly may be less than or equal to any of the values described herein. In some embodiments, the maximum output voltage of the battery assembly is about 0.01 V, 0.05 V, 0.1 V, 0.5 V, 1.0 V, 1.5 V, 2.0 V, 2.5 V, 3.0 V, 3.5 V, 4.0 V, 4.5 V, 5.0 V, 5.5 V, 6.0 V, 6.5 V, 7.0 V, 7.5 V, 8.0 V, 8.5 V, 9.0 V, 9.5 V, 10 V, 15 V, 20 V, 25 V, 30 V, 35 V, 40 V, 45 V, 50 V, 55 V, 60 V, 65 V, 70 V, 75 V, 80 V, 85 V, 90 V, 95 V, or 100 V. In some embodiments, the minimum output voltage of the battery assembly is about 0.01 V, 0.05 V, 0.1 V, 0.5 V, 1.0 V, 1.5 V, 2.0 V, 2.5 V, 3.0 V, 3.5 V, 4.0 V, 4.5 V, 5.0 V, 5.5 V, 6.0 V, 6.5 V, 7.0 V, 7.5 V, 8.0 V, 8.5 V, 9.0 V, 9.5 V, 10 V, 12 V, 14 V, 16 V, 18 V, 20 V, 22 V, 24 V, 26 V, 28 V, 30 V, 35 V, 40 V, 45 V, 50 V, 55 V, 60 V, 65 V, 70 V, 75 V, 80 V, 85 V, 90 V, 95 V, or 100 V. The maximum and/or minimum output voltages of the battery assembly may fall within a range between any two of the values described herein. In some embodiments, the output voltage of the battery assembly may be 12.6 V, 17.4 V, 25.2 V, or 26.1 V The amount of electric charge a battery assembly can deliver at a rated voltage may be referred to herein as the battery assembly's "capacity". The battery assembly may have a capacity greater than or equal to about 10 mAh, 50 mAh, 100 mAh, 200 mAh, 400 mAh, 600 mAh, 800 mAh, 1,000 mAh, 1,200 mAh, 1,400 mAh, 1,600 mAh, 1,800 mAh, 2,000 mAh, 2,200 mAh, 2,400 mAh, 2,600 mAh, 2,800 mAh, 3,000 mAh, 3,500 mAh, 4,000 mAh, 4,500 mAh, 5,000 mAh, 6,000 mAh, 7,000 mAh, 8,000 mAh, 9,000 mAh, 10,000 mAh, or 20,000 mAh. Optionally, the capacity of the battery assembly may be less than or equal to any of the values described herein. The capacity of the battery assembly may fall within a range between any two of the values described herein. In some embodiments, the capacity of the battery assembly may be 4480 mAh, 4500 mAh, 5200 mAh, or 5700 mAh.

A rechargeable battery assembly can be charged and discharged for a number of times. The number of discharge-charge cycles the battery can experience before it fails to meet specific performance may be referred to herein as the battery assembly's "number of charge cycles". The battery assembly may have a number of charge cycles greater than or equal to about 5, 10, 50, 100, 150, 200, 250, 300, 350, 400, 450, 500, 600, 700, 800, 900, 1,000, 1,200, 1,400, 1,600, 1,800, 2,000, 2,200, 2,400, 2,600, 2,800, 3,000, 3,400, 3,800, 4,000, 4,500, 5,000, 6,000, 7,000, 8,000, 10,000, 20,000, 30,000, 40,000, 50,000, 60,000, 70,000, 80,000, 90,000, or 100,000. Optionally, the charge cycles of the battery assembly may be less than or equal to any of the values described herein. The charge cycles of the battery assembly may fall within a range between any two of the values described herein. In some embodiments, the number of charge cycles of the battery assembly may be 200.

A lifetime of a battery assembly indicates how long a device can work on one complete charge of a rechargeable battery assembly. The battery assembly may have a lifetime greater than or equal to 1 s, 20 s, 40 s, 1 min, 5 min, 10 min, 15 min, 20 min, 25 min, 30 min, 35 min, 40 min, 45 min, 50 min, 55 min, 1.0 h, 1.2 h, 1.4 h, 1.6 h, 1.8 h, 2.0 h, 2.5 h, 3.0 h, 3.5 h, 4.0 h, 4.5 h, 5.0 h, 5.5 h, 6.0 h, 6.5 h, 7.0 h, 8 h, 9 h, or 10 h. Optionally, the lifetime of the battery assembly may be less than or equal to any of the values described herein. The lifetime of the battery assembly may fall within a range between any two of the values described herein. In some embodiments, the lifetime of the battery assembly may be 20 min.

A discharge rate of the battery assembly indicates how many hours the battery assembly may discharge before reaching a cut-off voltage, at certain current. The battery assembly may have a discharge rate greater than or equal to about 0.1 h, 0.2 h, 0.4 h, 0.6 h, 0.8 h, 1.0 h, 1.5 h, 2.0 h, 2.5 h, 3.0 h, 3.5 h, 4.0 h, 4.5 h, 5.0 h, 5.5 h, 6.0 h, 6.5 h, 7.0 h, 7.5 h, 8.0 h, 8.5 h, 9.0 h, 9.5 h, 10.0 h, 10.5 h, 11.0 h, 11.5 h, 12.0 h, 12.5 h, 13.0 h, 13.5 h, 14.0 h, 14.5 h, 15.0 h, 15.5 h, 16.0 h, 16.5 h, 17.0 h, 17.5 h, 18.0 h, 18.5 h, 19.0 h, 19.5 h, 20.0 h, 20.5 h, 21.0 h, 21.5 h, 22.0 h, 22.5 h, 23.0 h, 23.5 h, 24.0 h, 24.5 h, 25.0 h, 30.0 h, 35.0 h, or 40.0 h, at a current of 15 A. Optionally, the discharge rate of the battery assembly may be less than or equal to any of the values described herein. In some embodiments, the battery assembly has a maximum discharge rate equal to about 0.1 h, 0.2 h, 0.4 h, 0.6 h, 0.8 h, 1.0 h, 1.5 h, 2.0 h, 2.5 h, 3.0 h, 3.5 h, 4.0 h, 4.5 h, 5.0 h, 5.5 h, 6.0 h, 6.5 h, 7.0 h, 7.5 h, 8.0 h, 8.5 h, 9.0 h, 9.5 h, 10.0 h, 10.5 h, 11.0 h, 11.5 h, 12.0 h, 12.5 h, 13.0 h, 13.5 h, 14.0 h, 14.5 h, 15.0 h, 15.5 h, 16.0 h, 16.5 h, 17.0 h, 17.5 h, 18.0 h, 18.5 h, 19.0 h, 19.5 h, 20.0 h, 20.5 h, 21.0 h, 21.5 h, 22.0 h, 22.5 h, 23.0 h, 23.5 h, 24.0 h, 24.5 h, 25.0 h, 30.0 h, 35.0 h, or 40.0 h, at a current of 15 A. In some embodiments, the battery assembly has a minimum discharge rate equal to about 0.1 h, 0.2 h, 0.4 h, 0.6 h, 0.8 h, 1.0 h, 1.5 h, 2.0 h, 2.5 h, 3.0 h, 3.5 h, 4.0 h, 4.5 h, 5.0 h, 5.5 h, 6.0 h, 6.5 h, 7.0 h, 7.5 h, 8.0 h, 8.5 h, 9.0 h, 9.5 h, 10.0 h, 10.5 h, 11.0 h, 11.5 h, 12.0 h, 12.5 h, 13.0 h, 13.5 h, 14.0 h, 14.5 h, 15.0 h, 15.5 h, 16.0 h, 16.5 h, 17.0 h, 17.5 h, 18.0 h, 18.5 h, 19.0 h, 19.5 h, 20.0 h, 20.5 h, 21.0 h, 21.5 h, 22.0 h, 22.5 h, 23.0 h, 23.5 h, 24.0 h, 24.5 h, 25.0 h, 30.0 h, 35.0 h, or 40.0 h. The battery assembly may have a maximum and/or minimum discharge rate falling within a range between any two of the values described herein. In some embodiments, the discharge rate of the battery assembly is 20 min at a current of 15 A.

As previously described herein, in some embodiments, when a battery assembly is stored for extended periods of time at a partially or fully charged state, damage to the battery may occur, e.g., due to the chemistry of the battery cell(s). The damage may occur if the battery is stored for a time period greater than or equal to about 1 h, 2 h, 5 h, 10 h, 15 h, 20 h, 1 day, 2 days, 5 days, 10 days, 20 days, 50 days, 100 days, 200 days, 1 year, or 5 years. In some embodiments, damage may occur if the battery assembly is stored at greater than or equal to about 10%, 20%, 30%, 40%, 50%, 60%, 70%, 80%, 90%, or 100% of the maximum charge level of the battery assembly.

Accordingly, in order to avoid damage to the battery assembly, some embodiments of the present disclosure provide methods of monitoring the status of one or more battery assemblies and assessing whether the one or more battery assemblies should be discharged, e.g., due to being unused for an extended period of time. The methods presented herein can be performed entirely automatically, such that no user input is needed to initiate the self-discharge process.

An uncontrolled self-discharge may be a natural phenomenon occur in batteries or battery assemblies in which internal chemical reactions reduce the stored charge of the battery or battery assembly without any connection between the electrodes. The speed of uncontrolled self-discharge may depend on the type of battery, state of charge, charging current, ambient temperature and other factors. Among rechargeable batteries, Li-ion may absorb the least amount of self-discharge of around 2-3% discharge per month, then lead-acid at 4-6%. However, a controlled self-discharge may be a discharge to batteries or battery assemblies intentionally performed by the user, such that a voltage of the batteries or battery assemblies may drop to a safe value. The purpose of performing controlled self-discharge may be reducing or preventing a damaged to the batteries or battery assemblies which may otherwise occur due to a high chemical activity inside the batteries or battery assemblies.

The controlled self-discharge to the battery or battery assembly may be performed by the battery or battery assembly itself. For example, a self-discharging circuit and a battery management system may be part of the battery or battery assembly. The determination on if a self-discharge is to be initiated or terminated may be made by the battery management system, and the self-discharge may be performed by the self-discharging circuit. Alternatively, the controlled self-discharge to the battery or battery assembly may be performed by the object, such as a UAV, which the battery or battery assembly powers. For example, the determination on if a self-discharge is to be initiated or terminated may be made by components onboard the object.

FIG. 1 is a flow chart illustrating a method 100 of discharging a battery assembly in accordance with an embodiment of the disclosure. The method 100 may be used to discharge a battery assembly of an object, for example a movable object such as an UAV. Some or all of the steps of the method 100 can be performed by one or more processors operably coupled to the battery assembly.

In step 102 of the method 100, when the power to the object is turned off is detected. The turning off of the power may be detected by receiving a signal from the main switch of the object, indicating that a power to the object is turned off. Alternatively, the turning off the power may be detected by determining that substantially no electric current is flowing from the battery assembly to components of the object.

In step 104, an amount of time elapsed since the power to the object is turned off is detected. In some embodiments, the time elapsed may be measured by a timer, which is triggered by detecting the power to the object is turned off in step 102. For example, upon detecting that the power to the object is turned off, one or more processors can generate and transmit a signal to the timer to initiate the timing process.

In step 106, the amount of time elapsed since the power to the object is turned off is compared with a threshold length of time to determine if the amount of time exceeds a threshold length of time. In some embodiments, this determination may be made by comparing a value of the timer by the time length threshold.

In some instances, the threshold length of time may be set based on user input. For instance, the user may determine and input a threshold length of time, e.g., by considering the battery type, battery capacity, and/or battery storage time, etc. Alternatively, the threshold length of time may be predetermined, e.g., stored in a memory associated with the one or more processors. For instance, the predetermined time length threshold may be less than or equal to about: 1 s, 10 s, 30 s, 1 min, 10 min, 20 min, 30 min, 40 min, 50 min, 1 h, 2 h, 5 h, 10 h, 15 h, 20 h, 1 day, 2 days, 3 days, 4 days, 5 days, 6 days, 7 days, 8 days, 9 days, 10 days, 11 days 12 days, 13 days, 14 days or 15 days. The predetermined time length threshold may have a value greater than or equal to any of the values described herein. The predetermined time length threshold may have a value falling within a range between any two of the values described herein. Optionally, the threshold length of time may be automatically determined by one or more processors, for example by reading battery information such as battery type, battery capacity, battery voltage, etc. In some instance, the threshold length of time may be about 1 to 10 days.

If the determination in step 106 shows that the amount of time does not exceed the threshold length of time, then the method process goes back to step 104. In some embodiments, the method may perform the checking of step 106 at a frequency of every 1 s, 10 s, 30 s, 1 min, 15 min, 30 min, 45 min, 1 h, 2 h, 5 h, 10 h, 15 h, 20 h, 1 day, 2 days, 3 days, 4 days, or 5 days. The frequency to check the step 106 may have a value greater than or equal to any of the values described herein. The frequency to check the step 106 may have a value falling within a range between any two of the values described herein. In some instance, the method may perform the checking of step 106 every 1 hour.

If the determination in step 106 shows that the amount of time exceeds the threshold length of time, then in step 108, a controlled self-discharge of the battery assembly may be initiated. In some embodiments, the controlled self-discharge may be implemented by a self-discharging circuit which is electrically coupled to the battery assembly. Examples of self-discharging circuits are provided in further detail herein.

Optionally, the method of discharging a battery assembly in accordance with the embodiment of FIG. 1 may further include a step subsequent to step 108 in which when the power to the object is turned on may be detected. For example, the power to the object may be detected as being turned on during the controlled self-discharging, if the user switches the system switch on again. When the power to the object is turned on, the method of discharging a battery assembly in accordance with the embodiment of FIG. 1 may further include a step of terminating the controlled self-discharge of the battery assembly.

Figure 2:
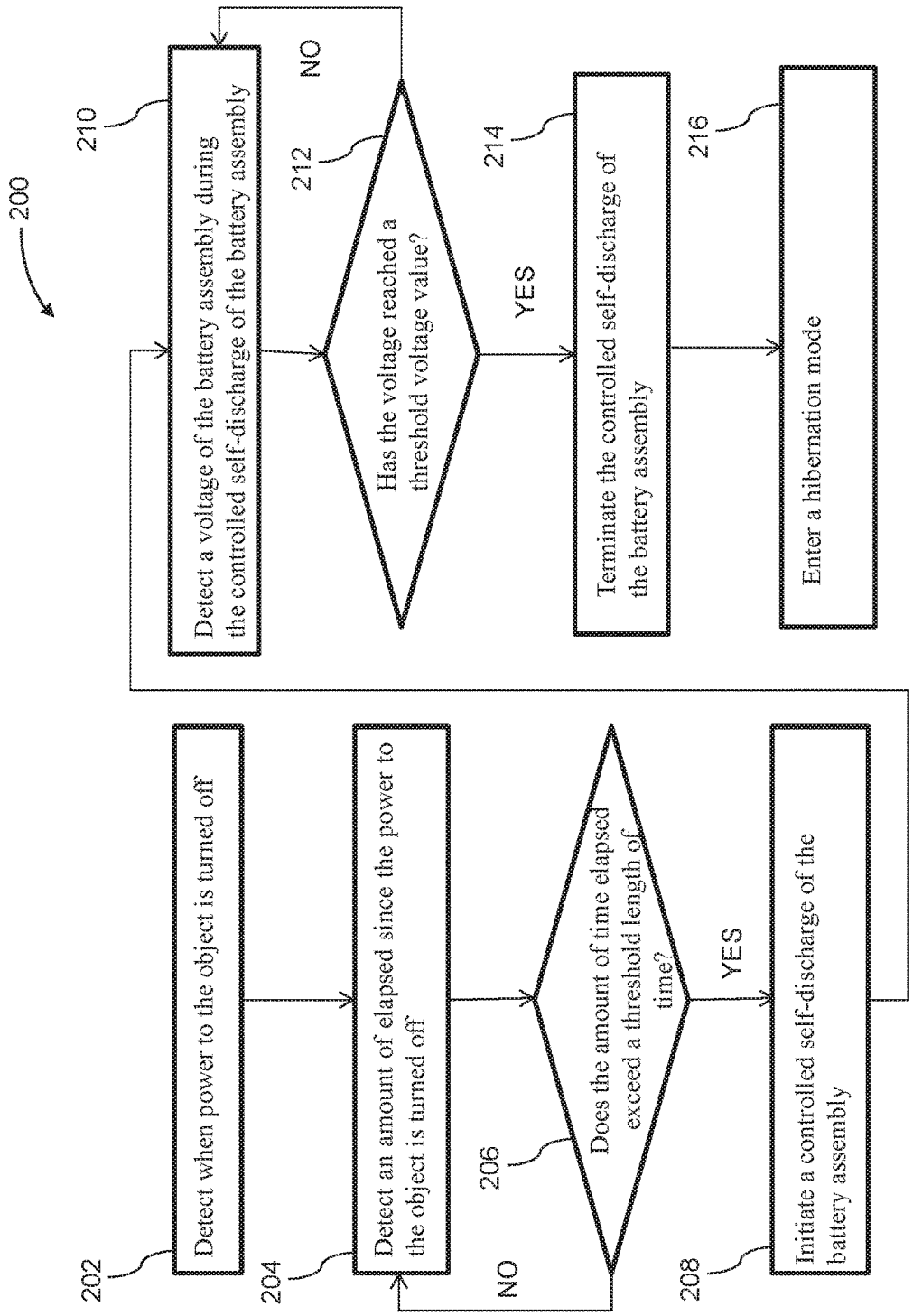
FIG. 2 is a flow chart illustrating a method of discharging a battery assembly in accordance with a further embodiment of the disclosure.

Alternatively, the method of discharging a battery assembly in accordance with the embodiment of FIG. 1 may further include a step subsequent to step 108 in which if the battery assembly powers at least a part of the object may be detected. For example, a current flowing from the battery assembly to components to be powered may be detected during the controlled self-discharging, if the user switches the system switch on again. When the battery assembly powers at least a part of the object, e.g., a current flows from the battery assembly, the method of discharging a battery assembly in accordance with the embodiment of FIG. 1 may further include a step of terminating the controlled self-discharge of the battery assembly FIG. 2 is a flow chart illustrating a method 200 of discharging a battery assembly in accordance with a further embodiment of the disclosure. The method 200 may be used to discharge a battery assembly of an object, for example a movable object including UAV. Some or all of the steps of the method 200 can be performed by one or more processors operably coupled to the battery assembly.

The steps 202 to 208 may be substantially identical to steps 102 to 108 as discussed above reference to FIG. 1. For example, in step 202, when power to the object is turned off is detected; in step 204, an amount of time elapsed since the power to the object is turned off is detected; and if the determination in step 206 shows that the amount of time exceeds a threshold length of time, then in step 208, a controlled self-discharge of the battery assembly is initiated.

The method of discharging a battery assembly in accordance with the embodiment of FIG. 2 may further comprise a step 210, in which a voltage of the battery assembly is detected during the controlled self-discharge. In step 212, a determination is made on whether the voltage of the battery assembly has reached a threshold voltage value by comparing the voltage of the battery assembly with the threshold voltage value.

The threshold voltage value may be an appropriate voltage value under which the battery assembly may be safely stored in a long term. For example, the battery assembly may not swell or leak and the lifetime of the battery assembly may not be shortened, even if it is stored under the threshold voltage value for a long-term storage period. In some instances, the long-term storage period for the battery assembly storage may be greater than or equal to about 1 min, 10 min, 20 min, 30 min, 40 min, 50 min, 1 h, 5 h, 10 h, 15 h, 20 h, 1 day, 5 days, 10 days, 15 days, 1 month, 2 months, 4 months, 6 months, 8 months, 10 months, 1 year, 2 years, 4 years, 6 years, 8 years, or 10 years. Optionally, the long-term storage period may be less than or equal to any of the values described herein. The long-term storage period may have a value falling within a range between any two of the values described herein.

In some instances, the threshold voltage value may be a voltage less than or equal to about 0.01 V, 0.02 V, 0.04 V, 0.06 V, 0.08 V, 0.1 V, 0.2 V, 0.4 V, 0.6 V, 0.8 V, 1.0 V, 1.2 V, 1.4 V, 1.6V, 1.8 V, 2.0 V, 2.2 V, 2.4 V, 2.6 V, 2.8 V, 3.0 V, 3.2 V, 3.4 V, 3.6 V, 3.8 V, 4.0 V, 4.2 V, 4.4 V, 4.6 V, 4.8 V, 5.0 V, 5.5 V, 6.0V, 6.5 V, 7.0 V, 7.5 V, 8.0 V, 8.5 V, 9.0 V, 9.5 V, 10 V, 15 V, 20 V, 25 V, 30 V, 40 V, 50 V, or 60 V. Optionally, the threshold voltage value may be greater than or equal to any of the values described herein. The threshold voltage value may have a value falling within a range between any two of the values described herein. In some embodiments, the threshold voltage value may be about 50% of the nominal voltage of the battery assembly. For instances, the threshold voltage value may be about 38 V for a 10-cell battery assembly, each cell having a nominal voltage of 7.6 V. The term "nominal voltage" may be referred herein to indicate the reported or reference voltage of the cell or battery.

In alternative embodiments, detecting a voltage of the battery assembly during the controlled self-discharge of the battery assembly in step 210 may comprising detecting an average voltage of the plurality of battery cells of the battery assembly. For example, the battery assembly may be composed of 10 cells each having a nominal voltage of 7.6 V. Detecting a voltage of the battery assembly in step 210 may then comprise detecting an average voltage of the 10 cells. In this example, the threshold voltage value may be set to about 50% a nominal voltage of one cell, that is, 3.8 V.

If the voltage of the battery assembly during the controlled self-discharge is determined to have not reached the threshold voltage value in step 212, then the method process goes back to step 210. In some embodiments, the method may perform the checking of step 212 at a frequency of every 0.1 s, 0.5 s, 1 s, 5 s, 10 s, 20 s, 30 s, 40 s, 50 s, 1 min, 5 min, 10 min, 20 min, 30 min, or 1 h. The frequency to check the step 212 may have a value greater than or equal to any of the values described herein. The frequency to check the step 212 may have a value falling within a range between any two of the values described herein. In some instance, the method may perform the checking of step 212 every 30 s.

If the voltage of the battery assembly during the controlled self-discharge is determined to have reached the threshold voltage value in step 212, then in step 214, the controlled self-discharge of the battery assembly is terminated. Optionally, the method of discharging a battery assembly in accordance with the embodiment of FIG. 2 may further comprise a step 216 subsequent to step 214, in which the battery assembly enters a hibernation mode. The hibernation mode may be a low power consumption mode in which the battery assembly provides substantially no current to the electrical components of the object, but simply monitors whether the battery assembly is in use again, e.g., if a power button of the object is pressed, if the power to the object is turned on, and/or if the battery assembly is charged. In some instances, if the power to the object is turned on during the hibernation mode, the battery assembly may exit the hibernation mode and become activated again.

Figure 3:
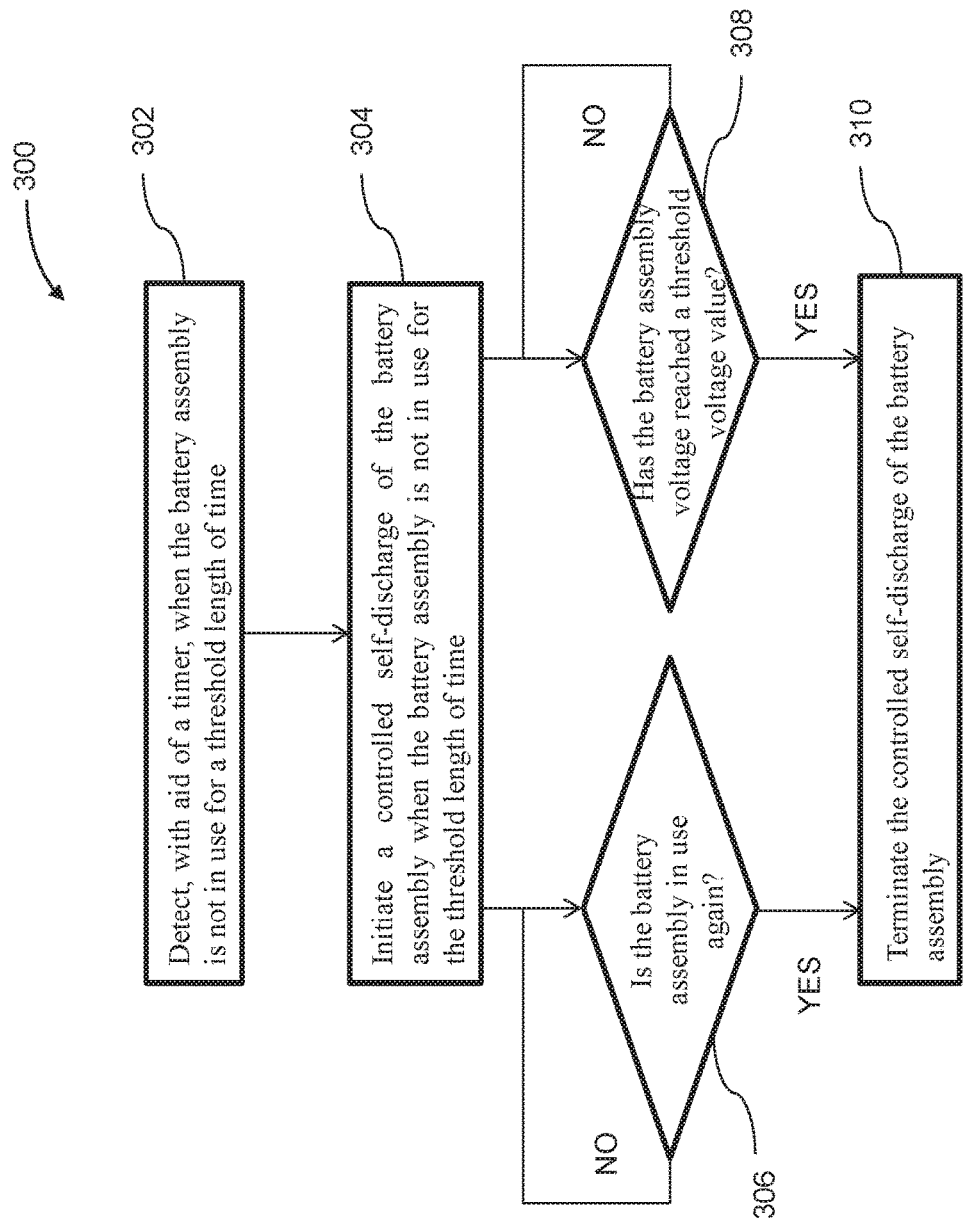
FIG. 3 is a flow chart illustrating a method of discharging a battery assembly in accordance with a yet further embodiment of the disclosure.

FIG. 3 is a flow chart illustrating such a method 300 of discharging a battery assembly in accordance with a yet further embodiment of the disclosure. The method 300 may be used to discharge a battery assembly of an object, for example a movable object including UAV. The method 300 may particularly be used in a system having a plurality of battery assemblies which may be independently turned on and off. Some or all of the steps of the method 300 can be performed by one or more processors operably coupled to the battery assembly.

In step 302, when the battery assembly is not in use for a threshold length of time is determined, with aid of timer. The battery assembly can be considered to not be in use when it is no longer providing power to the object, e.g., is electrically uncoupled from the object. In some embodiments, the not in use state of the battery assembly may be determined by detecting where there is current flowing from the battery assembly to one or more components of the object. For instance, if substantially no current is flowing from the battery assembly, the battery assembly may be determined as being not in use. In some embodiments, a timer may be used to determine if the battery assembly has not been in use for a threshold length of time. The timing of the timer may be initiated (e.g., by one or more processors) in response to the detection that the battery assembly is not in use. For instance, the timer may be triggered to start timing upon detecting that substantially no current is flowing from the battery assembly.

In some instances, the threshold length of time may be set based on user input. For instance, the user may determine and input a threshold length of time, e.g., by considering the battery type, battery capacity, and/or battery storage time, etc. Alternatively, the threshold length of time may be predetermined, e.g., stored in a memory associated with the one or more processors. For instance, the predetermined time length threshold may be less than or equal to about: 1 s, 10 s, 30 s, 1 min, 10 min, 20 min, 30 min, 40 min, 50 min, 1 h, 2 h, 5 h, 10 h, 15 h, 20 h, 1 day, 2 days, 3 days, 4 days, 5 days, 6 days, 7 days, 8 days, 9 days, 10 days, 11 days 12 days, 13 days, 14 days or 15 days. The predetermined time length threshold may have a value greater than or equal to any of the values described herein. The predetermined time length threshold may have a value falling within a range between any two of the values described herein. In some instance, the threshold length of time may be about 1 to 10 days. Optionally, the threshold length of time may be automatically determined by one or more processors, by reading information such as battery type, battery capacity, battery voltage out from the battery assembly.

If the battery assembly is detected as being not in use for the threshold length of time, then the method may proceed to step 304, in which a controlled self-discharge of the battery assembly is initiated. In some embodiments, the controlled self-discharge may be implemented by a self-discharging circuit which is electrically coupled to the battery assembly, as described in further detail herein.

During the self-discharge of the battery assembly, the method 300 may determine if certain criteria is met for terminating the self-discharge. The criteria under which the self-discharge of the battery assembly is terminated may include, for example, the battery assembly being in use again and/or the battery assembly voltage has reached a threshold voltage value. In some embodiments, the method 300 may determine if the battery assembly is in use again in step 306, and simultaneously or sequentially, the method 300 may determine if the battery assembly voltage has reached a threshold voltage value in step 308.

In step 306, it is determined if the battery assembly is in use again during the controlled self-discharge. In some embodiments, the determination on if the battery assembly is in use again may be made by detecting if the battery assembly is providing power to the object, e.g., when a current flows from the battery assembly to one or more components of the object. For example, if a current flowing from the battery assembly is detected during the controlled self-discharge, then the method may proceed to step 310.

In step 308, it is determined if the battery assembly voltage has reached a threshold voltage value. The determination in step 308 is substantially similar to that of step 212. The threshold voltage value may be an appropriate voltage value under which the battery assembly may be safely stored in a long term. In some embodiments, the threshold voltage value may be about 50% a nominal voltage of the battery assembly, and the voltage of the battery assembly may be compared with the threshold voltage value. For instances, the threshold voltage value may be about 38 V for a 10-cell battery assembly, each cell having a nominal voltage of 7.6 V. In alternative embodiments, the threshold voltage value may be set to about 50% of the nominal voltage of one cell, and an average voltage of the cells may be compared with the threshold voltage value. For instance, the threshold voltage value may be 3.8 V for a 10-cell battery assembly, each cell having a nominal voltage of 7.6 V. If the voltage of the battery assembly is detected as reaching the threshold voltage value in step 308, then the method may proceed to step 310.

In step 310, the controlled self-discharge of the battery assembly is terminated. In some embodiments, if the controlled self-discharge of the battery assembly is terminated because the battery assembly is in use again (for example, the user is operating the UAV again), the battery assembly may resume supplying power to the object or one or more components thereof. Otherwise, if the controlled self-discharge of the battery assembly is terminated because the voltage of the battery assembly reaches the threshold voltage value, then the method may optionally further comprise a step subsequent to step 310, in which the battery assembly enters a hibernation mode, as disclosed herein above.

The battery assembly monitoring and self-discharging methods described herein can be implemented using various types of systems and devices. In some embodiments, a battery management system is used to detect a current operational status of the battery assembly and/or an object powered by the battery assembly (e.g., whether the battery assembly is in use, whether the object is turned off), and initiate and/or terminate controlled self-discharge of the battery assembly if appropriate. The battery management system can be coupled to one or more battery assemblies, e.g., via suitable electrical couplings. Additionally, the battery management system can be coupled to a self-discharging circuit that permits controlled self-discharge of the one or more battery assemblies. In some embodiments, the one or more battery assemblies, the battery management system, and the self-discharging circuit are provided within a single unitary housing, such that these components can be provided as a single unit, e.g., a unit that can be removed from the object. In alternative embodiments, the battery management system and/or self-discharging circuit are provided separately from the battery assembly and coupled to the battery assembly during use. For example, the battery management system and/or self-discharging circuit can be provided as part of the object.

Figure 4:
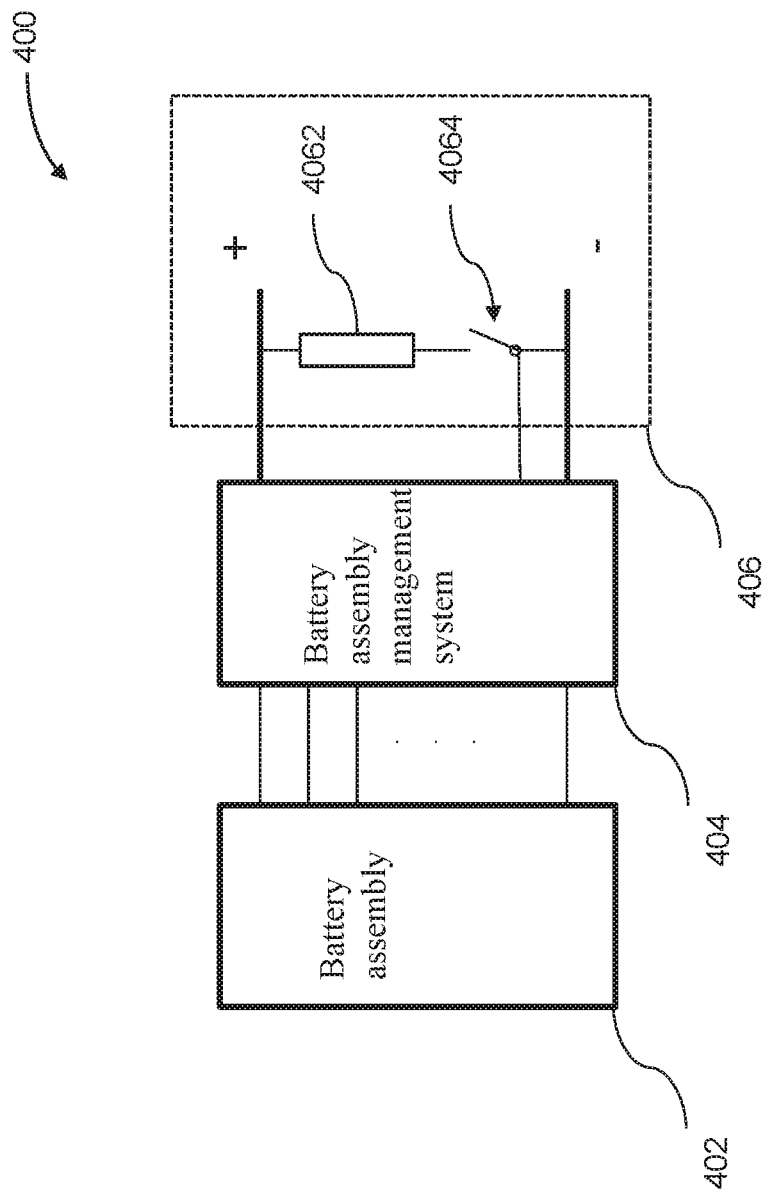
FIG. 4 shows an apparatus for managing discharge of a battery assembly in accordance with an embodiment of the disclosure.

FIG. 4 shows an example of apparatus 400 for managing discharge of a battery assembly in accordance with an embodiment of the disclosure. A battery management system 404 may be provided for the battery assembly 402. The battery management system 404 may be electrically connected to each battery cell of the battery assembly 402 such that the discharge of each battery cell may be controlled independently. In alternative embodiments, the discharge of each cell may be linked, such that the individual cells are not capable of being discharged independently. The battery management system 404 may be configured to control an operation of a self-discharging circuit 406 which is electrically coupled to the battery assembly 402. The self-discharging circuit 406 may comprise a self-discharging resistor 4062 and a control switch 4064 which are connected in parallel with positive and negative terminals of the battery assembly 402. The self-discharging resistor 4062 can be connected in series with the control switch 4064. For instance, the value of the self-discharging resistor may be less than or equal to about: 1Ω, 5Ω, 10Ω, 50Ω, 100Ω, 150Ω, 200Ω, 250Ω, 300Ω, 350Ω, 400Ω, 450Ω, 500Ω, 550Ω, 600Ω, 650Ω or 700Ω. The value of the self-discharging resistor may have a value greater than or equal to any of the values described herein. The value of the self-discharging resistor may have a value falling within a range between any two of the values described herein. In some embodiments, a value of the self-discharging resistor may be less than or equal to about: 200Ω or 500Ω.

In some embodiments, the battery management system 404 may control the operation of the self-discharging circuit 406 by controlling an on/off state of the control switch 4064. In some embodiments, the controlled self-discharge of the battery assembly 402 may be initiated when the control switch 4064 is switched to a closed state (e.g., the switch is "on"), and may be terminated when the control switch 4064 is switched to an open state (e.g., the switch is "off"). In some instances, the switching of the control switch 4064 may be controlled automatically by the battery management system 404. For instance, the battery management system 404 may control and switch the control switch 4064 to the closed state if the amount of time elapsed since the power to the object is turned off exceeds a threshold length of time as previously described herein, and switch the control switch 4064 to open state if certain criteria is met. Alternatively, the switching of the control switch 4064 may be controlled manually by the user. For instances, before storing the battery assembly 402, the user may manually switch the control switch to closed state, such that the battery assembly 402 may self-discharge. Then, the user may manually switch the control switch 4064 to the open state to terminate the discharge.

As previously described herein, the battery assembly 402 may be used to power at least a part of an object. The object may be a movable object or a stationary object. In some embodiments, the movable object may be an unmanned aerial vehicle (UAV), and the battery assembly 402 may be used to power at least the propulsion system of the UAV, for example, a rotor of the UAV. In some instances, the battery assembly 402 may comprise a plurality of battery cells which are electrically connected in series or in parallel. Alternatively, the battery assembly 402 may comprise only a single battery cell. In some embodiments, the battery assembly 402, battery management system 404 and the self-discharging circuit 406 may be provided within a housing, for example, a housing of UAV.

The battery management system 404 may comprise a timer. In some embodiments, the timer may be triggered to start timing upon receiving a signal (e.g., from the battery management system 404, or from the object which the battery assembly powers) when the power to the object is turned off, and may detect an amount of time that elapses since the power to the object is turned off. If an amount of time elapsed exceeds a threshold length of time, the battery management system 404 may cause to start discharging the battery assembly 402 via the self-discharging circuit 406. The threshold length of time may be set based on user input, or may be predetermined, as disclosed herein above.

In some embodiments, the battery management system 404 may detect if a voltage of the battery assembly during the self-discharge of the battery assembly 402 reaches a threshold voltage value, and cause the battery to terminate the self-discharge via the self-discharging circuit 406 if the voltage of the battery assembly 402 reaches the threshold voltage value. The threshold voltage value may be an appropriate voltage value under which the battery assembly 402 may be safely stored in a long term. In some instances, the threshold voltage value may be about 50% of the nominal voltage of the battery assembly 402. For example, the threshold voltage value may be about 38 V. Alternatively, the threshold voltage value may be about 50% of the nominal voltage of each cell of the battery assembly 402. For example, the threshold voltage value may be about 3.8 V. The battery management system 404 may optionally cause the battery assembly 402 enter a hibernation mode, as disclosed herein above.

In some embodiments, the timer may be triggered to start timing upon receiving a signal indicating the battery assembly is not in use. When the battery assembly is not in use for a threshold length of time (e.g., a value of the timer exceeds the threshold length of time), the battery management system 404 may cause the battery assembly to start discharging via the self-discharging circuit 406. In some embodiments, the battery management system 404 may detect if the battery assembly 402 is in use again during the self-discharge, and may cause the battery assembly to terminate the self-discharge via the self-discharging circuit 406 if the battery assembly 402 is in use again. In some instances, a determination on if the battery assembly is in use again may be made by detecting when a current flows from the battery assembly 402 to other components of the object, as disclosed herein above. Simultaneously, the battery management system 404 may also detect if a voltage of the battery assembly during the self-discharge of the battery assembly 402 reaches a threshold voltage value, and cause the battery to terminate the self-discharge via the self-discharging circuit 406 if the voltage of the battery assembly 402 reaches the threshold voltage value.

In some embodiments, the timer of the battery management system 404 may be triggered by external signals, such as a signal indicating that the power to the object is turned off, or a signal indicating that the battery assembly is not in use. The signal for triggering the timer may be communicated from the object, such as a UAV. This signal communication may be a functionality of the object, and may be particularly important for a UAV.

In some embodiments, the processes of the battery management system 404 may be performed by one or more processors individually or collectively. The processor may be provided as part of control circuit of the UAV, or, it can be provided as an independent circuit, module or chip. The processor may be implemented by Central Processing Unit (CPU), Application Specific Integrated Circuit (ASIC), or Field Programmable Gate Array (FPGA). Any description herein of a processor may apply to one or more processors, which may individually or collectively perform any functions described for the processor. The processor may be capable of executing one or more steps in accordance with non-transitory computer readable media comprising code, logic, or instructions for performing one or more steps. Memory storage units may be provided which may comprise the non-transitory computer readable media.

One or more processors may be provided onboard the object, for example a UAV. One or more processors may be provided off-board the object, for example a UAV. In some instances, an external device may be provided with the processor(s) that may process the audio signals. In some instances the external device may be a controller of the UAV. The controller of the UAV may control flight of the UAV, a sensor of the UAV, a carrier of the UAV, a payload of the UAV, or any other component of the UAV. In some other instances, the external device may be a display device and/or speaker. The external device may be a monitor, speaker, desktop computer, laptop computer, tablet, cell phone, smartphone, personal digital assistant, or any other device. In some instances, one or more processors may be distributed over the UAV and one or more external devices, or over a plurality of external devices. The processors that may be distributed over the UAV and/or devices may individually or collectively generate the processed signals.

In some embodiments, the object may carry a plurality of battery assemblies onboard. For example, a UAV may carry a plurality of battery assemblies, each having one or more battery cells, to power different components (e.g., sensors, flight controller, propulsion system, gimbal, camera, etc.) onboard the UAV. The plurality of battery assemblies may have different types, different capacities, different output voltages, different lifetime, etc. In this case, the battery management system 404 may collectively control the self-discharge of the plurality of battery assemblies.

In some embodiments, the battery management system 404 may identify one or more battery assemblies meeting certain criteria from the plurality of battery assemblies. For example, the certain criteria may be if an amount of time elapsed since the power to the object is turned off exceeds a threshold length of time, and/or if the battery assembly is not in use for a threshold length of time. If the certain criteria is met for one or more battery assemblies, the battery management system 404 may control the operation of the self-discharging circuit, which may be individually provided for each battery assembly, in order to initiate and/or terminate the controlled self-discharging.

In some embodiment, the timer in the battery management system 404 may detect an amount of time that elapses since the power to the object is turned off for each battery assembly. If an amount of time elapsed exceeds a threshold length of time for one or more battery assemblies among the plurality, the battery management system 404 may cause the one or more battery assemblies to start discharging via the respective self-discharging circuit. In some embodiments, the timer may be triggered to start timing upon receiving a signal indicating one or more battery assemblies among the plurality are not in use. When the one or more battery assemblies are not in use for a threshold length of time, the battery management system 404 may cause the one or more battery assemblies to start discharging via the respective self-discharging circuit.

In some embodiments, the battery management system 404 may detect if a voltage of one or more battery assemblies during the self-discharge reaches a threshold voltage value, and cause the one or more battery assemblies to terminate the self-discharge if the voltage of the one or more battery assemblies reaches the threshold voltage value. In some embodiments, the battery management system 404 may detect if the one or more battery assemblies are in use again during the self-discharge, and may cause the one or more battery assemblies to terminate the self-discharge via the respective self-discharging circuit if the one or more battery assemblies are in use again.

Figure 5:
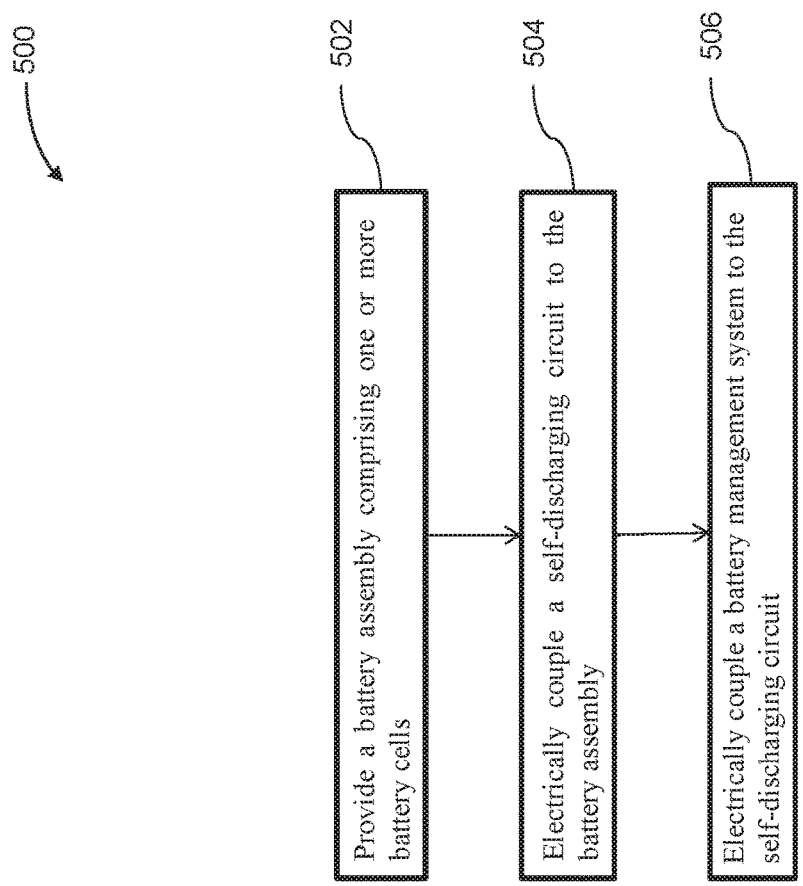
FIG. 5 is a flow chart illustrating a method of assembling an apparatus for managing discharge of a battery assembly in accordance with an embodiment of the disclosure.

FIG. 5 is a flow chart illustrating a method 500 of assembling an apparatus for managing discharge of a battery assembly in accordance with an embodiment of the disclosure.

In step 502, a battery assembly comprising one or more battery cells is provided. The battery assembly may be used to provide electric power to at least a part of the object. In some embodiments, the object may be a UAV. The battery assembly may be used to power a propulsion system of the UAV, for example, a rotor of the UAV. Alternatively, the battery assembly may be used to power electrical components on board the UAV, including but not limited to, control system (e.g., flight controller), sensors, communication system, payload, etc.

In step 504, a self-discharging circuit is electrically coupled to the battery assembly. In some embodiments, the self-discharging circuit may comprise a self-discharging resistor and a control switch connected in parallel with positive and negative terminals of the battery assembly. The self-discharging resistor and the control switch may be connected in series. The self-discharging circuit can be electrically coupled to the battery assembly, e.g., using wires, cables, pins, contacts, and the like.

In step 506, a battery management system is electrically coupled to the self-discharging circuit. Optionally, the battery management system can be electrically coupled to the battery assembly. In some embodiments, the battery management system may control an operation of the control switch, as previously described herein. In some instances, the controlled self-discharge of the battery assembly may be initiated when the control switch is switched to a closed state (e.g., the switch is "on"), and may be terminated when the control switch is switched to an open state (e.g., the switch is "off").

The battery management system may comprise a timer. In some embodiments, the timer may be triggered to start timing upon receiving a signal that the power to the object has been turned off and may detect an amount of time elapsed since the power to the object is turned off. If an amount of time elapsed exceeds a threshold length of time, the battery management system may cause the battery assembly to start discharging the battery assembly via the self-discharging circuit. The threshold length of time may be set based on user input, or may be predetermined, as disclosed herein above. In some embodiments, the battery management system may detect if a voltage of the battery assembly during the self-discharge of the battery assembly reaches a threshold voltage value, and cause the battery to terminate the self-discharge via the self-discharging circuit if the voltage of the battery assembly reaches the threshold voltage value. The threshold voltage value may be an appropriate voltage value under which the battery assembly may be safely stored in a long term. The battery management system may optionally cause the battery assembly enter a hibernation mode, as disclosed herein above.

In other embodiments, the timer may be triggered to start timing upon receiving a signal indicating the battery assembly is not in use for a threshold length of time. In this case, the battery management system may cause the battery assembly to start discharging the battery assembly via the self-discharging circuit. In some embodiments, the battery management system may detect if the battery assembly is in use again during the self-discharge, and may cause the battery assembly to terminate the self-discharge via the self-discharging circuit if the battery assembly is in use again. In some instances, a determination on if the battery assembly is in use again may be made by detecting when a current flows from the battery assembly, as disclosed herein above. Simultaneously, the battery management system may also detect if a voltage of the battery assembly during the self-discharge of the battery assembly reaches a threshold voltage value, and may cause the battery to terminate the self-discharge via the self-discharging circuit if the voltage of the battery assembly reaches the threshold voltage value.

In the embodiments described herein, the battery assembly may be discharged under certain criteria, for example, the power to an object is turned off for a threshold length of time, or the battery assembly is not in use for a threshold length of time. In a multi-battery system, the discharged electric (e.g., electrical power) may be collected to charge other battery assemblies onboard the object by the battery management system. This may be important for a UAV, for example, the collected power may extend the work time of the UAV. Alternatively or collectively, the discharged electric may be collected to charge a rechargeable battery onboard the object. This rechargeable battery may have a large capacity to store the discharged electric from other battery assemblies, such that the battery assemblies may be stored safely, for example, with a storage voltage less than 50% a nominal voltage of the battery assembly.

In some embodiments, a UAV may carry a plurality of battery assemblies onboard to power different components, including but not limited to, control systems (e.g., flight controller), sensors, communication system, payload (e.g., camera, gimbal), etc. The plurality of battery assemblies may have different capacities, different lifetime, etc., such that one battery assembly may be exhausted while another battery assembly may substantially full. If the UAV is to be stored, the battery assembly having substantially full power may be self-discharged under the control of a battery management system, as described hereinabove. The discharged electric may be collected by the battery management system and be used to charge another substantially exhausted battery assembly. Alternatively, any excess electric from the battery assembly having substantially full power after the charging may be collected by the battery management system and be used to charge a rechargeable battery onboard the UAV. Alternatively, the discharged electric from the battery assembly having substantially full power may be directly collected by the battery management system and be used to charge a rechargeable battery onboard the UAV.

Figure 6:
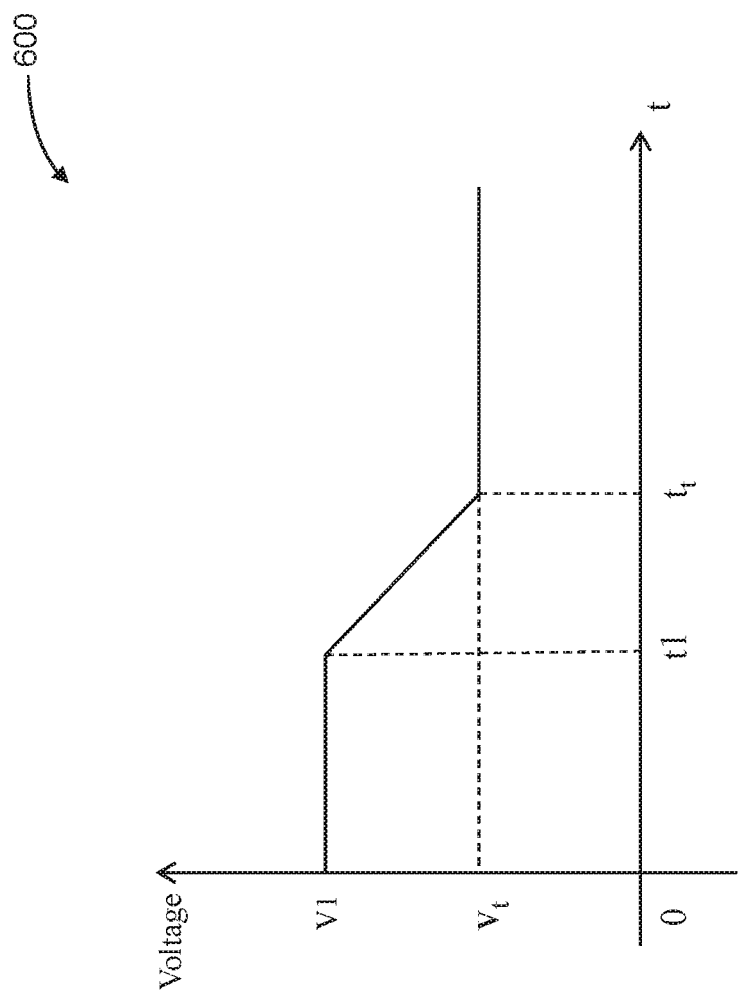
FIG. 6 is a diagram illustrating the voltage change of a battery assembly in accordance with embodiments of the present disclosure.

FIG. 6 is a diagram 600 illustrating the voltage change of a battery assembly in accordance with embodiments of the present disclosure. The lateral axis of the diagram 600 is a time axis, and the vertical axis is an axis illustrating the voltage of the battery assembly which is to be stored in a long-term.

In some embodiments, the battery assembly used to power at least part of an object, such as a UAV, may be detected as not in use at a time t=0. At this time t=0, the voltage of the battery assembly may be V1. Alternatively, the power to the object may be detected as being turned off at a time t=0. At this time t=0, the voltage of the battery assembly may be V1.

In some embodiments, an amount of time elapsed since the battery assembly is detected as not in use may be detect, for example by a timer. Alternatively, an amount of time elapsed since the power to the object is turned off may be detected, for example by a timer. The controlled self-discharging of the battery assembly may be initiated when the amount of time detected by the timer exceeds a threshold length of time $t_r$.

The voltage of the battery assembly may drop during the controlled self-discharge until certain criteria is met. In some embodiments, the controlled self-discharge may be terminated when the voltage of the battery assembly reaches a threshold voltage value $V_t$ at a time $t=t_r$. The threshold voltage value $V_t$ may be a voltage value which is safe for long-term storage of the battery assembly, as discussed herein above.

In some instances, the controlled self-discharge may be terminated if the power to the object, such as a UAV, is turned on or the battery assembly is in use again during the controlled self-discharge, as discussed herein above. In these cases, the voltage of the battery assembly may not drop to the threshold voltage value $V_t$.

The systems, devices, and methods described herein can be applied to a wide variety of objects, including movable objects and stationary objects. As previously mentioned, any description herein of an aerial vehicle, such as a UAV, may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$3, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 7:
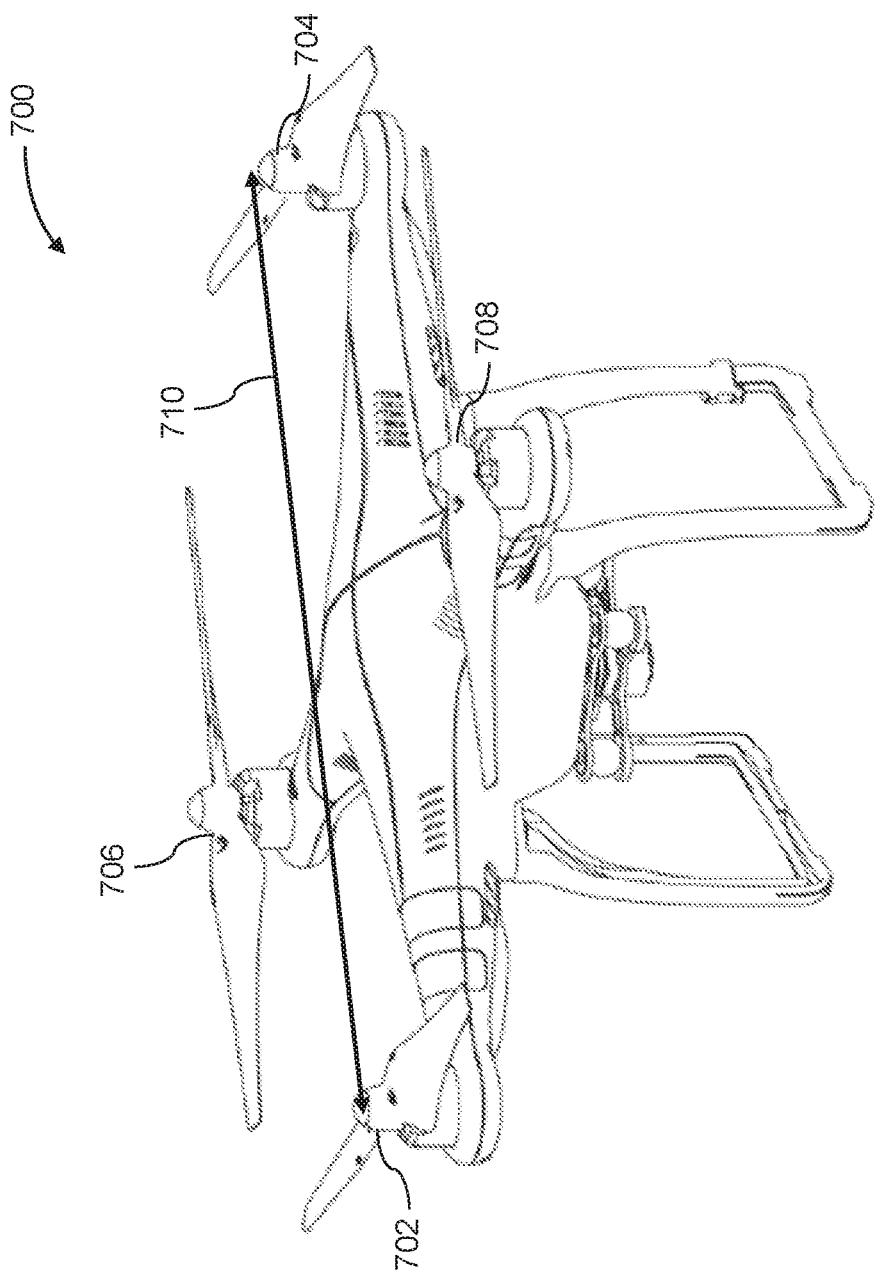
FIG. 7 illustrates an appearance of UAV in accordance with embodiments of the present disclosure.

FIG. 7 illustrates an unmanned aerial vehicle (UAV) 700, in accordance with embodiments of the present disclosure. The UAV may be an example of a movable object as described herein, to which the method and apparatus of discharging a battery assembly may be applied. The UAV 700 can include a propulsion system having four rotors 702, 704, 706, and 708. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 710. For example, the length 710 can be less than or equal to 2 m, or less than or equal to 5 m. In some embodiments, the length 710 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 8:
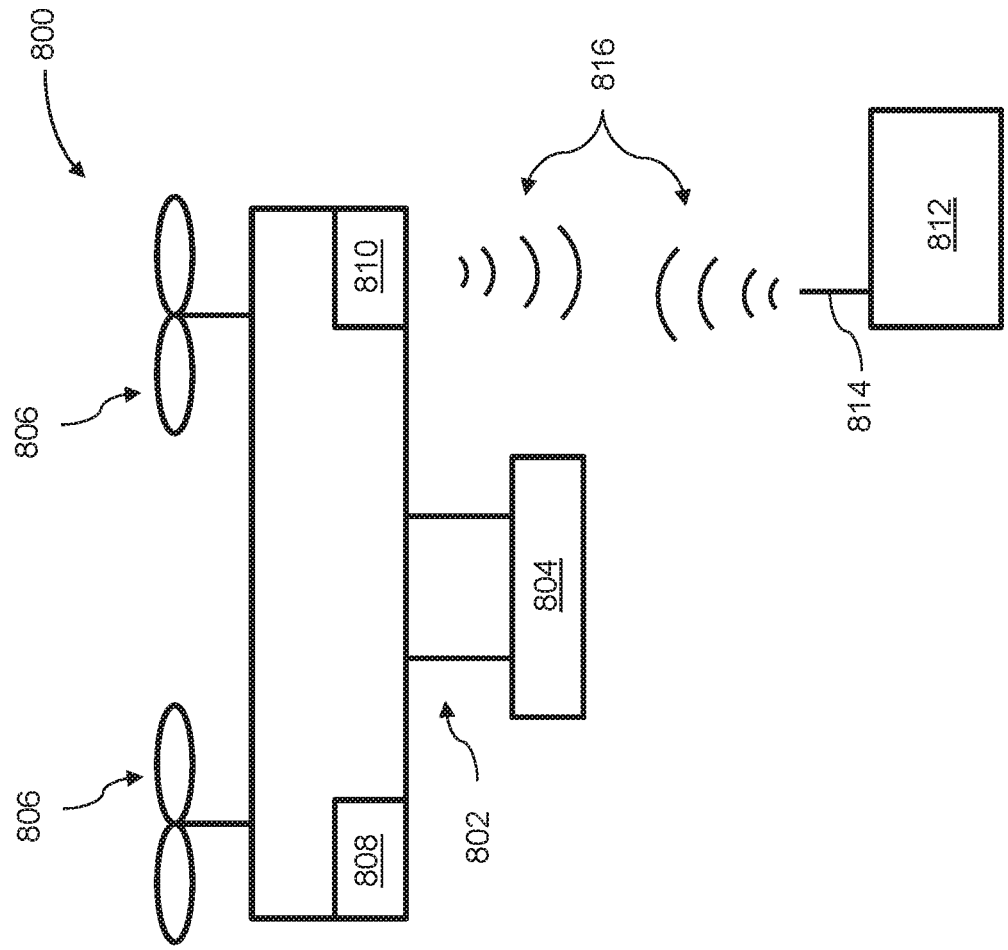
FIG. 8 illustrates a movable object including a carrier and a payload, in accordance with embodiments of the present disclosure.

FIG. 8 illustrates a movable object 800 including a carrier 802 and a payload 804, in accordance with embodiments of the present disclosure. Although the movable object 800 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 804 may be provided on the movable object 800 without requiring the carrier 802. The movable object 800 may include propulsion mechanisms 806, a sensing system 808, and a communication system 810.

The propulsion mechanisms 806 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 806 can be mounted on the movable object 800 using any suitable means, such as a support element (e.g., a drive shaft) as described elsewhere herein. The propulsion mechanisms 806 can be mounted on any suitable portion of the movable object 800, such on the top, bottom, front, back, sides, or suitable combinations thereof.

In some embodiments, the propulsion mechanisms 806 can enable the movable object 800 to take off vertically from a surface or land vertically on a surface without requiring any horizontal movement of the movable object 800 (e.g., without traveling down a runway). Optionally, the propulsion mechanisms 806 can be operable to permit the movable object 800 to hover in the air at a specified position and/or orientation. One or more of the propulsion mechanisms 806 may be controlled independently of the other propulsion mechanisms. Alternatively, the propulsion mechanisms 806 can be configured to be controlled simultaneously. For example, the movable object 800 can have multiple horizontally oriented rotors that can provide lift and/or thrust to the movable object. The multiple horizontally oriented rotors can be actuated to provide vertical takeoff, vertical landing, and hovering capabilities to the movable object 800. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 800 (e.g., with respect to up to three degrees of translation and up to three degrees of rotation).

The sensing system 808 can include one or more sensors that may sense the spatial disposition, velocity, and/or acceleration of the movable object 800 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 808 can be used to control the spatial disposition, velocity, and/or orientation of the movable object 800 (e.g., using a suitable processing unit and/or control module, as described below). Alternatively, the sensing system 808 can be used to provide data regarding the environment surrounding the movable object, such as weather conditions, proximity to potential obstacles, location of geographical features, location of manmade structures, and the like.

The communication system 810 enables communication with terminal 812 having a communication system 814 via wireless signals 816. The communication systems 810, 814 may include any number of transmitters, receivers, and/or transceivers suitable for wireless communication. The communication may be one-way communication, such that data can be transmitted in only one direction. For example, one-way communication may involve only the movable object 800 transmitting data to the terminal 812, or vice-versa. The data may be transmitted from one or more transmitters of the communication system 810 to one or more receivers of the communication system 812, or vice-versa. Alternatively, the communication may be two-way communication, such that data can be transmitted in both directions between the movable object 800 and the terminal 812. The two-way communication can involve transmitting data from one or more transmitters of the communication system 810 to one or more receivers of the communication system 814, and vice-versa.

In some embodiments, the terminal 812 can provide control data to one or more of the movable object 800, carrier 802, and payload 804 and receive information from one or more of the movable object 800, carrier 802, and payload 804 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 806), or a movement of the payload with respect to the movable object (e.g., via control of the carrier 802). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 808 or of the payload 804). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 812 can be configured to control a state of one or more of the movable object 800, carrier 802, or payload 804. Alternatively or in combination, the carrier 802 and payload 804 can also each include a communication module configured to communicate with terminal 812, such that the terminal can communicate with and control each of the movable object 800, carrier 802, and payload 804 independently.

In some embodiments, the movable object 800 can be configured to communicate with another remote device in addition to the terminal 812, or instead of the terminal 812. The terminal 812 may also be configured to communicate with another remote device as well as the movable object 800. For example, the movable object 800 and/or terminal 812 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 800, receive data from the movable object 800, transmit data to the terminal 812, and/or receive data from the terminal 812. Optionally, the remote device can be connected to the Internet or other telecommunications network, such that data received from the movable object 800 and/or terminal 812 can be uploaded to a website or server.

Figure 9:
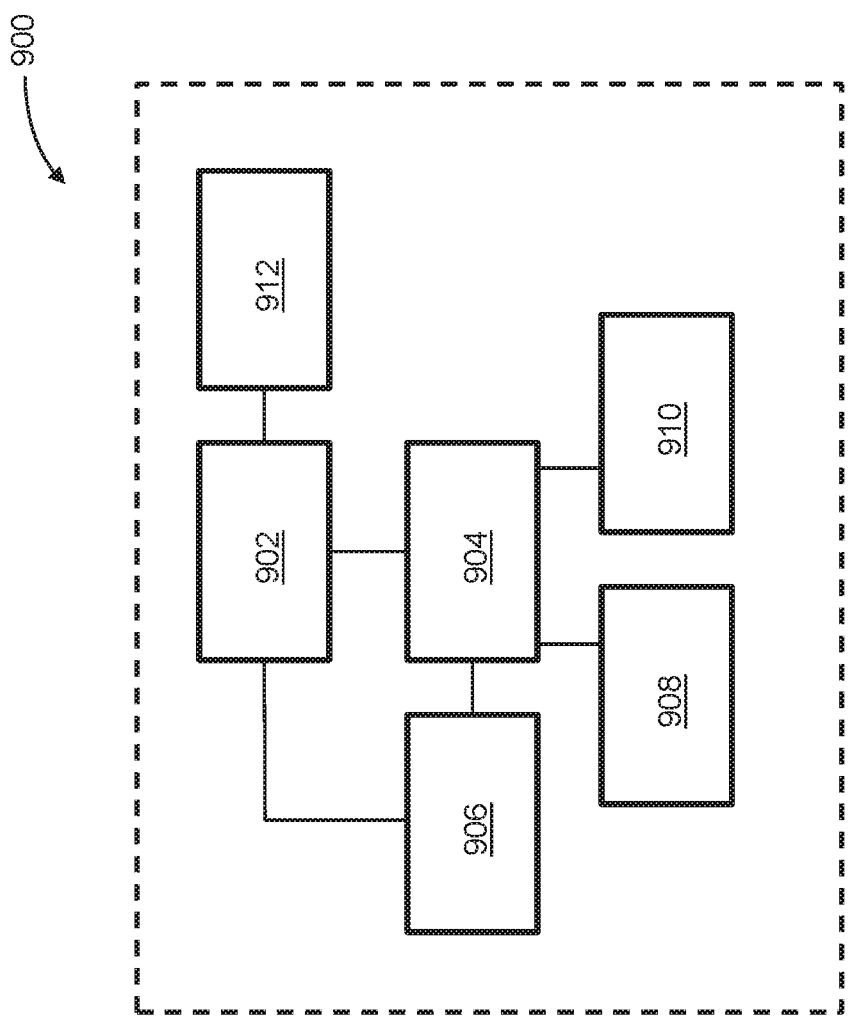
FIG. 9 is a schematic illustration by way of block diagram of a system for controlling a movable object, in accordance with embodiments of the present disclosure.

FIG. 9 is a schematic illustration by way of block diagram of a system 900 for controlling a movable object, in accordance with embodiments of the present disclosure. The system 900 can be used in combination with any suitable embodiment of the systems, devices, and methods disclosed herein. The system 900 can include a sensing module 902, processing unit 904, non-transitory computer readable medium 906, control module 908, and communication module 910.

The sensing module 902 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 902 can be operatively coupled to a processing unit 904 having a plurality of processors. In some embodiments, the sensing module can be operatively coupled to a transmission module 912 (e.g., a Wi-Fi image transmission module) configured to directly transmit sensing data to a suitable external device or system. For example, the transmission module 912 can be used to transmit images captured by a camera of the sensing module 902 to a remote terminal.

The processing unit 904 can have one or more processors, such as a programmable processor (e.g., a central processing unit (CPU)). The processing unit 904 can be operatively coupled to a non-transitory computer readable medium 906. The non-transitory computer readable medium 906 can store logic, code, and/or program instructions executable by the processing unit 904 for performing one or more steps. The non-transitory computer readable medium can include one or more memory units (e.g., removable media or external storage such as an SD card or random access memory (RAM)). In some embodiments, data from the sensing module 902 can be directly conveyed to and stored within the memory units of the non-transitory computer readable medium 906. The memory units of the non-transitory computer readable medium 906 can store logic, code and/or program instructions executable by the processing unit 904 to perform any suitable embodiment of the methods described herein. For example, the processing unit 904 can be configured to execute instructions causing one or more processors of the processing unit 904 to analyze sensing data produced by the sensing module. The memory units can store sensing data from the sensing module to be processed by the processing unit 904. In some embodiments, the memory units of the non-transitory computer readable medium 906 can be used to store the processing results produced by the processing unit 904.

In some embodiments, the processing unit 904 can be operatively coupled to a control module 908 configured to control a state of the movable object. For example, the control module 908 can be configured to control the propulsion mechanisms of the movable object to adjust the spatial disposition, velocity, and/or acceleration of the movable object with respect to six degrees of freedom. Alternatively or in combination, the control module 908 can control one or more of a state of a carrier, payload, or sensing module.

The processing unit 904 can be operatively coupled to a communication module 910 configured to transmit and/or receive data from one or more external devices (e.g., a terminal, display device, or other remote controller). Any suitable means of communication can be used, such as wired communication or wireless communication. For example, the communication module 910 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 910 can transmit and/or receive one or more of sensing data from the sensing module 902, processing results produced by the processing unit 904, predetermined control data, user commands from a terminal or remote controller, and the like.

The components of the system 900 can be arranged in any suitable configuration. For example, one or more of the components of the system 900 can be located on the movable object, carrier, payload, terminal, sensing system, or an additional external device in communication with one or more of the above. Additionally, although FIG. 9 depicts a single processing unit 904 and a single non-transitory computer readable medium 906, one of skill in the art would appreciate that this is not intended to be limiting, and that the system 900 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 900 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A method of discharging a battery assembly used to power at least part of an object, the method comprising:
   detecting, with aid of one or more processors, when power to the object is turned off;
   detecting, with aid of a timer, an amount of time elapsed since the power to the object is turned off;
   initiating, with aid of the one or more processors, a controlled self-discharge of the battery assembly when the amount of time exceeds a threshold length of time, wherein the controlled self-discharge of the battery assembly is performed by a self-discharging circuit electrically coupled to the battery assembly;
   terminating, with aid of the one or more processors, the controlled self-discharge of the battery assembly when the voltage reaches a threshold voltage value; and
   controlling, with aid of the one or more processors, the battery assembly to enter a hibernation mode subsequent to terminating the controlled self-discharge of the battery assembly, wherein the hibernation mode is a low power consumption mode monitoring whether the battery assembly is in use again.

2. The method of claim 1, further comprising detecting a voltage of the battery assembly during the controlled self-discharge of the battery assembly.

3. The method of claim 1, wherein the threshold voltage value is about 50% of a nominal voltage of the battery assembly.

4. The method of claim 3, wherein the threshold voltage value is about 38V.

5. The method of claim 1, wherein the threshold voltage is configured to enable safe long-term storage of the battery assembly.

6. The method of claim 1, further comprising detecting when the power to the object is turned on.

7. The method of claim 6, further comprising terminating the controlled self-discharge of the battery assembly when the power to the object is turned on.

8. The method of claim 1, further comprising detecting if the battery assembly powers the at least the part of the object.

9. The method of claim 8, further comprising terminating the controlled self-discharge of the battery assembly if the battery assembly powers the at least the part of the object.

10. The method of claim 1, wherein the self-discharging circuit comprises a self-discharging resistor and a control switch connected in parallel with positive and negative terminals of the battery assembly.

11. The method of claim 10, wherein the controlled self-discharge is initiated when the control switch is switched to a closed state and is terminated when the control switch is switched to an open state.

12. The method of claim 1, wherein the battery assembly comprises a plurality of battery cells.

13. The method of claim 1, wherein the battery assembly comprises only a single battery cell.

14. The method of claim 1, wherein the object is a movable object.

15. The method of claim 14, wherein the movable object is an unmanned aerial vehicle (UAV).

16. The method of claim 15, wherein the battery assembly is onboard the UAV.

17. The method of claim 15, wherein the battery assembly is used to power a propulsion system of the UAV.

18. The method of claim 1, wherein the battery assembly is within a housing of the object.

19. The method of claim 1, wherein a voltage of the battery assembly is controlled to be decreased at a constant decreasing speed during the controlled self-discharge of the battery assembly.

* * * * *